(12) United States Patent
Nebel

(10) Patent No.: US 7,347,484 B2
(45) Date of Patent: Mar. 25, 2008

(54) BED LIFT MECHANISM

(75) Inventor: Michael W. Nebel, Smith Center, KS (US)

(73) Assignee: Lippert Components, Inc., Goshen, IN (US)

( * ) Notice: Subject to any disclaimer, the term of this patent is extended or adjusted under 35 U.S.C. 154(b) by 253 days.

(21) Appl. No.: 11/136,632

(22) Filed: May 23, 2005

(65) Prior Publication Data

US 2006/0260044 A1    Nov. 23, 2006

(51) Int. Cl.
*B60P 1/00* (2006.01)

(52) U.S. Cl. ..................................... 296/156

(58) Field of Classification Search ............. 296/26.01, 296/164, 158, 156; 5/118, 11, 618, 611, 5/10.2, 9.1
See application file for complete search history.

(56) References Cited

U.S. PATENT DOCUMENTS

| | | | | |
|---|---|---|---|---|
| 1,945,875 A * | 2/1934 | Woller | .......................... | 5/10.2 |
| 4,485,894 A * | 12/1984 | Soule et al. | ................. | 187/229 |
| 4,592,564 A * | 6/1986 | Warnock et al. | ............ | 280/402 |
| 4,837,877 A * | 6/1989 | Hamada et al. | ............... | 5/10.2 |
| 5,092,650 A | 3/1992 | Perlot | | |
| 5,593,260 A * | 1/1997 | Zimmerman | ................. | 410/20 |
| 5,791,715 A * | 8/1998 | Nebel | ....................... | 296/26.13 |
| 5,940,911 A * | 8/1999 | Wang | .............................. | 5/610 |
| 6,507,962 B2 * | 1/2003 | Thurston | ....................... | 5/10.2 |
| 6,550,081 B2 * | 4/2003 | Vilsmeier | ........................ | 5/11 |
| 6,592,163 B1 | 7/2003 | Nebel | | |
| 6,651,273 B2 * | 11/2003 | Vilsmeier | ........................ | 5/11 |
| 6,691,342 B2 * | 2/2004 | Sherman | ........................ | 5/136 |
| 6,983,979 B2 * | 1/2006 | Rasmussen | ................. | 296/156 |
| 6,983,980 B2 * | 1/2006 | Rasmussen | ................. | 296/156 |
| 6,988,760 B2 * | 1/2006 | Rasmussen | ................. | 296/156 |
| 7,121,612 B2 * | 10/2006 | Rasmussen | ................. | 296/156 |
| 7,121,613 B1 * | 10/2006 | Rasmussen | ................. | 296/156 |
| 7,198,320 B2 * | 4/2007 | Rasmussen | ................. | 296/170 |
| 2004/0262946 A1 | 12/2004 | Rasmussen | | |
| 2004/0262947 A1 | 12/2004 | Rasmussen | | |
| 2004/0262949 A1 | 12/2004 | Rasmussen | | |
| 2005/0001449 A1 | 1/2005 | Rasmussen | | |
| 2005/0239586 A1 * | 10/2005 | Nebel | .......................... | 474/58 |
| 2006/0066131 A1 * | 3/2006 | Nebel | .......................... | 296/156 |

* cited by examiner

*Primary Examiner*—Kiran B. Patel
(74) *Attorney, Agent, or Firm*—Darby & Darby P.C.

(57) ABSTRACT

A lift mechanism is mounted to a support for raising and lowering a bed. The lift mechanism is attached to a side of the bed and includes at least one chain, at least one bed bracket connected to the chain, and a drive mechanism for controllably moving the chain to move the bed bracket and the bed between a respective raised position and lowered position. The bed bracket includes a chain connector for connecting to the chain, a chain guide member receiving the chain and attached to the chain connector, and a bed support member attaching to the chain guide member and to the bed. At least a portion of the bed support member is inserted through the chain guide member. The bed bracket is compact and easy to manufacture and provides a secure connection between the lift mechanism and the bed.

12 Claims, 9 Drawing Sheets

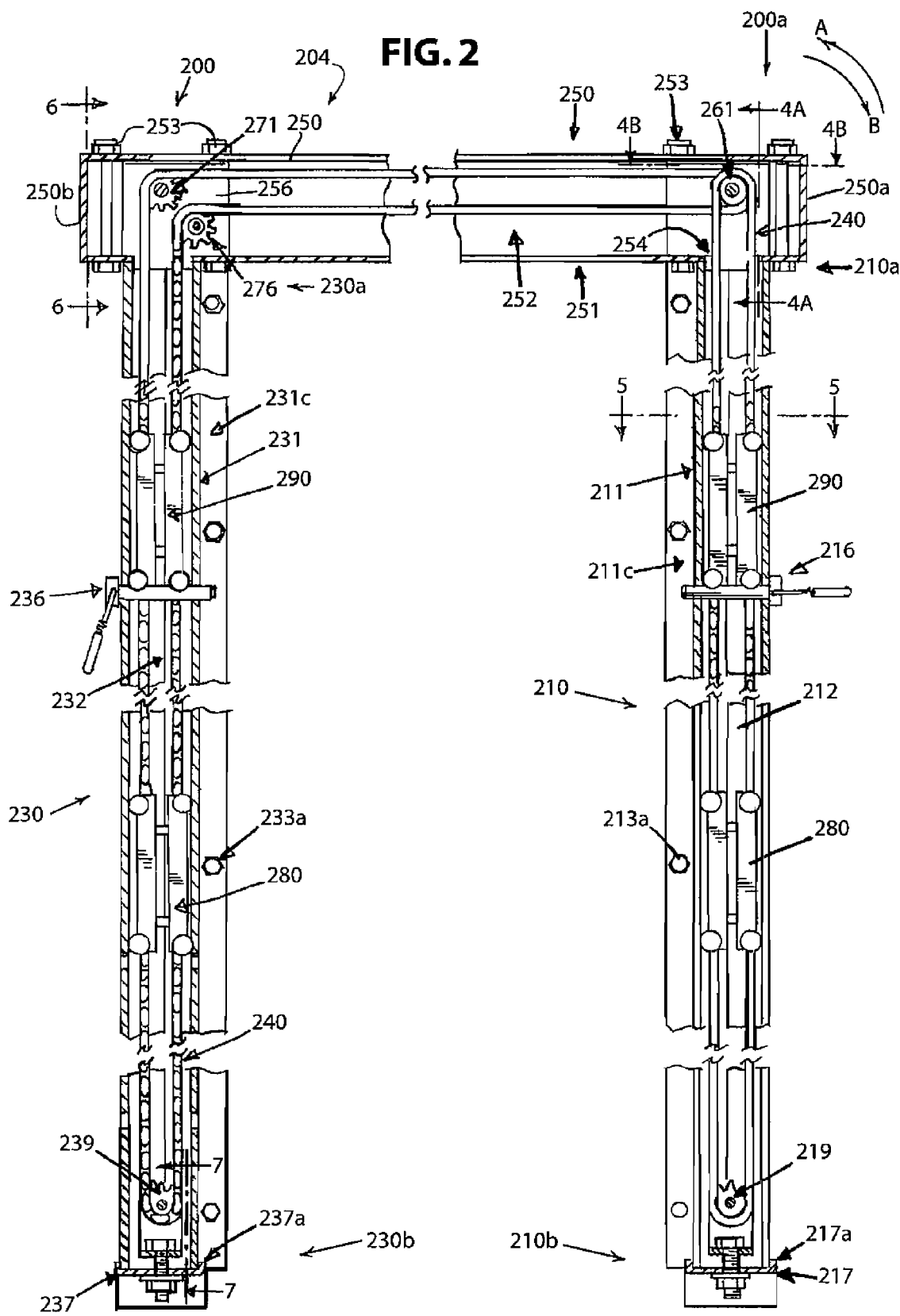

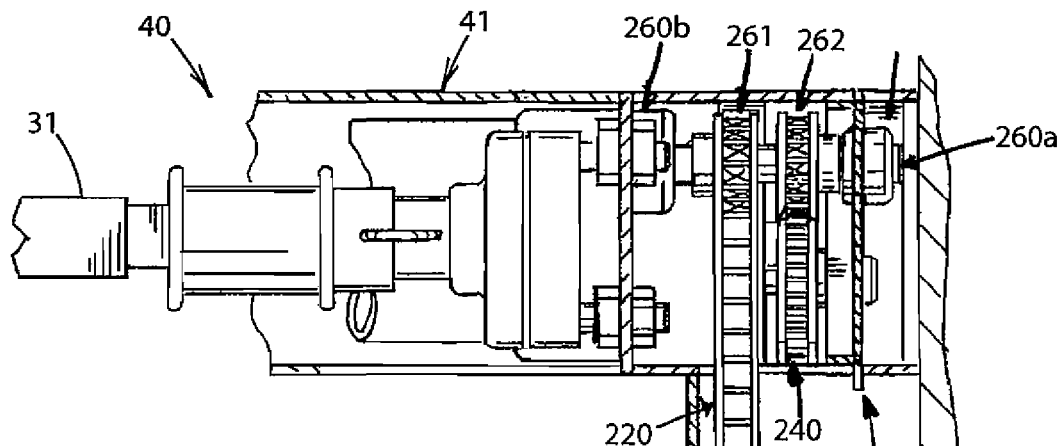
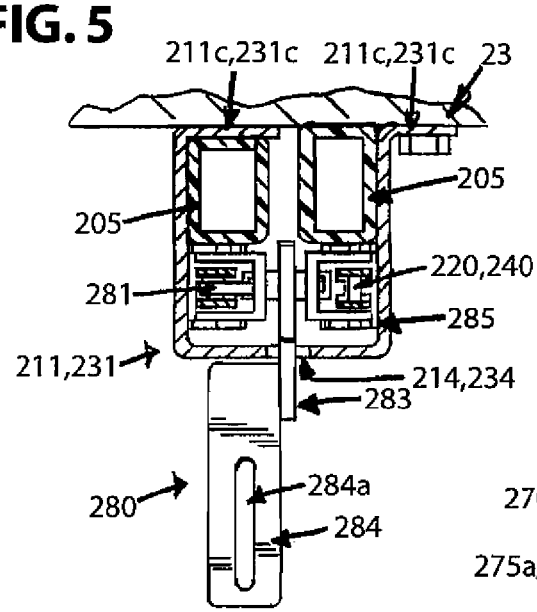
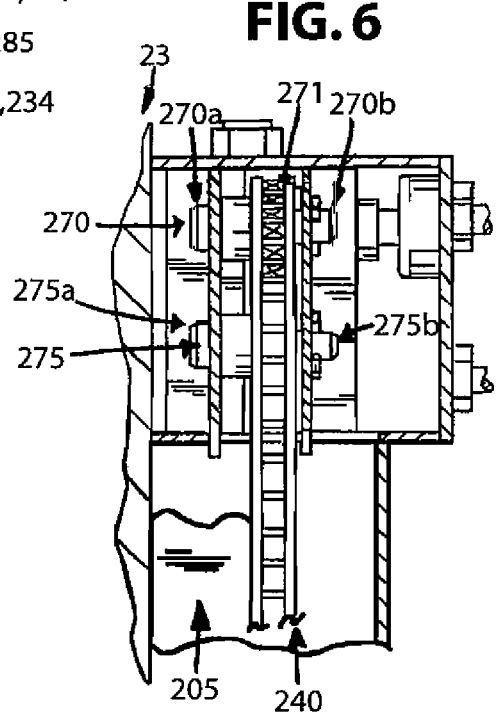

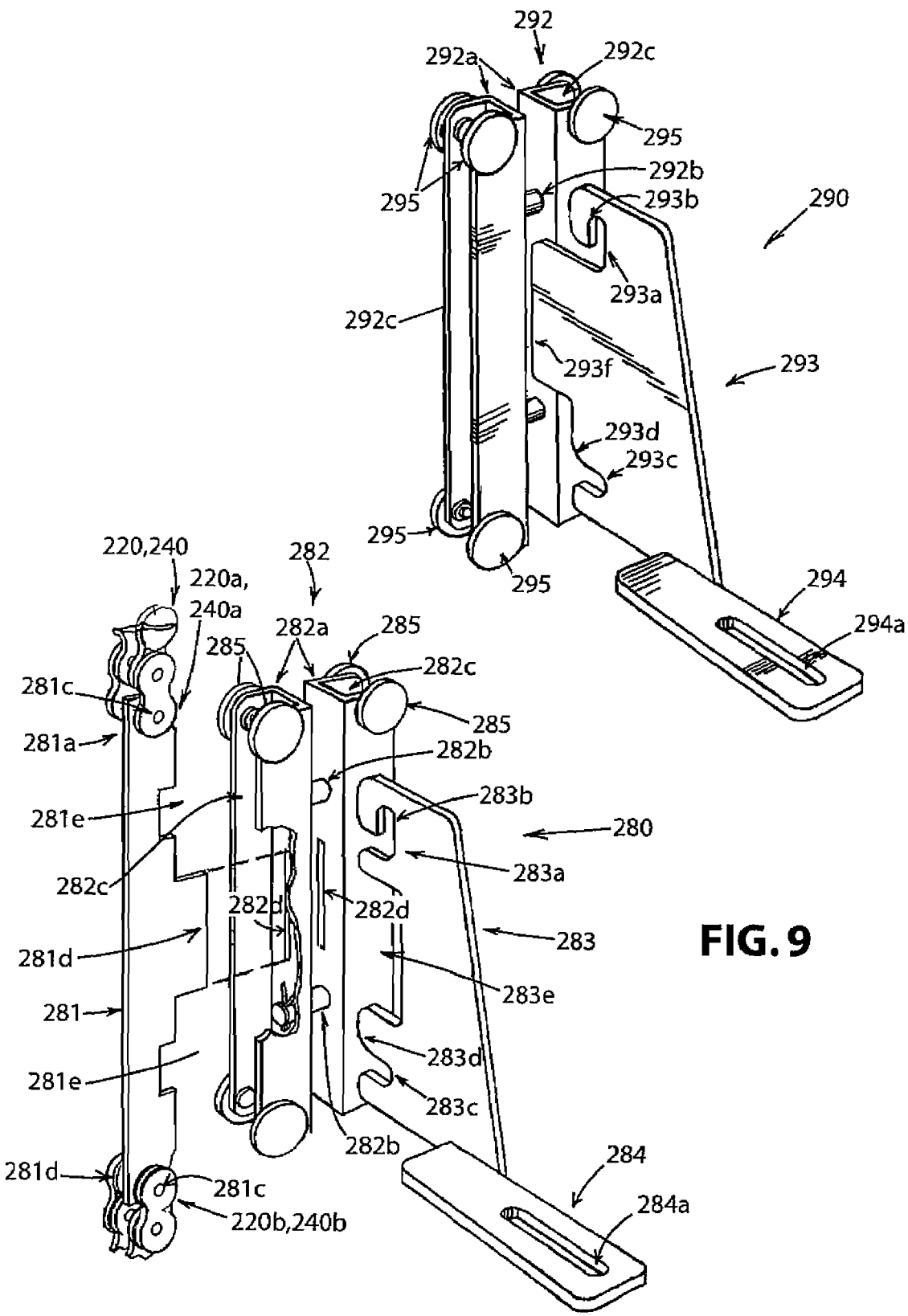

BED LIFT MECHANISM

TECHNICAL FIELD

The present invention relates to lift mechanisms, and more particularly, relates to a lift mechanism that moves a bed in a controlled manner from a lowered position to a raised position.

BACKGROUND

Conventional recreational vehicles (RVs) are available in a number of different types depending upon the size requirements and other desires of the purchaser. For example, the purchaser or user can select an RV that is motorized and can be driven by itself or one can be selected that requires a tow vehicle to tow the RV. Consumers increasingly want additional, increased interior room and also want to be provided with additional options available with the RV. One option that has found increasing commonality in the recent years is the incorporation of a rear section of the RV for storing one or more all-terrain vehicles (ATVs), dirt bikes, or other types of all-terrain, off-road, and recreational vehicles or motorized equipment, such as lawn mowers, etc. The section for storing the ATVs can be incorporated into any number of different types of RVs including motor homes and fifth wheel trailer type RVs. An RV for storing ATVs is often referred to as a "toy trailer" or "toy hauler."

The toy trailer can include all the amenities of a conventional RV. The rear section can be an entirely separate area that is divided from a living area by a wall and a door. The incorporation of furniture in the rear section of the toy trailer is desirable since it results in an increase in the available space for use as a living area after the ATVs have been unloaded. Oftentimes the toy trailer has a pull down bed, benches, or tables that can fold up, via hinges or other device, against the inside of the side walls of the rear section of the toy trailer. By mounting a pull down bed, bench, or table to the side walls of the rear section, the user can simply swing the bed, bench, or table down when desired. The pull down bed, benches, or tables can swing down after the ATVs have been removed from the toy trailer.

When the ATVs are to be loaded back into the toy trailer, the bed, bench, or table is placed back in its storage positions, thereby increasing the overall available interior space in the rear section of the toy trailer.

The bed, bench and table are typically mounted on the side walls of the rear section. However, each bed, bench, or table decreases the amount of available space in the rear section of the toy trailer, since they must be stored on the side walls alongside the ATVs. Thus, there is less space in the toy trailer to store the ATVs.

U.S. Pat. No. 5,092,650 relates to a bed stored in an overhead area of a front portion of an RV where the driver and passenger seating is located. The bed is lowered when the RV is parked. A motor and a pair of torque tubes are disposed parallel to two side rails of the bed frame and are coupled so that the motor and torque tubes rotate together. The torque tubes span the length of the bed between two end rails positioned near the respective side walls of the RV. The torque tubes, the motor, and the side rails of the bed frame take up a significant amount of space, thereby increasing the amount of space required for installing and operating the bed. Furthermore, there are several rotating components exposed underneath the bed, e.g., the torque tubes and the motor, that are a safety hazard since items can be caught between the rotating components, thereby preventing the use of the underside of the bed between the side rails as a storage area. In addition, there are no safety mechanisms for preventing the bed from inadvertently dropping. Moreover, the motor moves with the bed, thereby requiring power cables to the motor to rise and fall with the movement of the motor. Having the power cable move up and down with the motor and the bed creates an unattractive appearance and a potential safety hazard.

FIG. 11 is an exploded perspective view of a section of a mounting assembly 1 that supports a bed (not shown) of a conventional bed lift mechanism as disclosed in U.S. Patent Application Publications No. 2004/0262946, No. 2004/0262947, No. 2004/0262949, and No. 2005/0001449. The mounting assembly 1 includes flat irons 2 that are attached using fasteners (not shown) to a bed angle 3 that supports the bed. Each of the flat irons 2 connect to an L-shaped bed bracket 4, the horizontal portion 4a of which is positioned flush against the lower surface of the flat iron 2. The vertical portion 4b of the bed bracket 4 is coupled to a moving bracket (not shown) that moves up and down via a chain drive mechanism in a vertical member. The flat iron 2 is coupled to the horizontal portion 4a of the bed bracket 4 using a clevis pin 5. A cotter key 6 is inserted into a hole 5a in the clevis pin 5 to fasten the flat iron 2 to the bed bracket 4.

The bed bracket 4 is formed as a flat piece with a straight bend. However, this flat piece is not strong enough in some cases.

The bed bracket 4 is provided with a slot 4c. The length of the slot 4c allows the mounting assembly 1 to be provided in the RVs having walls that are not completely parallel. The clevis pins 5 can slide along the slots 4c in the bed bracket 4 to allow the bed to settle in position with respect to the bed bracket 4.

The flat iron 2 is offset above and at a distance from the bed bracket 4, thereby creating a leverage problem. This offset connection of the bed bracket to the flat iron 2 permits the beds to bounce up and down when the RV is driven. The clevis pin 5 and flat iron 2 create a fulcrum that pries the bed angle 3 from the bed. The fasteners that fasten the angle iron 3 to the bed support the entire weight of the bed while it is bouncing up and down. The weight of the beds create a jarring effect on the fasteners that pulls the fasteners loose from the bed. When the fasteners are pulled loose, the beds can easily fall down to the floor of the RV. As described above, the space under the beds is commonly used to store ATVs and other large items, which are damaged when positioned under the falling beds.

Furthermore, aluminum tubing is now very often used in forming the bed frame of the bed. Since aluminum tubing is relatively thin, the screws can pull out very easily from the bed frame, thereby making it more common for the beds to break away from the bed angle 3.

New holes must be drilled into the bed frame to reinsert the fasteners and to mount the bed frame back on the bed angle 3. This is an inconvenience to the user since it likely requires the operator to bring the trailer to a mechanic or repair center and also spoils the appearance of the bed.

The vertical members (not shown) of the conventional bed lift mechanism includes channels that are as deep as 2". To install the bed lift mechanism, the user must insert screws within an opening in the vertical members, which has a typical width of 1" or more, to fasten the vertical members to the side wall of the RV. However, if the installer accidentally drops the screw while positioning it inside the channel, the screw will most likely lodge in the chain-sprocket mechanism at the bottom of the channel inside the vertical member. Unless the installer retrieves the screw from the chain-sprocket mechanism, the screw may damage the chain-sprocket mechanism during the operation of the bed lift mechanism.

What has heretofore not been available is an alternative reliable lift mechanism for easily and smoothly moving the bed, bench, or table between a lowered position and a raised position and that provides an easy to install mounting assembly that ensures a stable and secure coupling to the bed or bed frame, while providing a small, motorized trailer.

What has also heretofore not been available is an alternative reliable lift mechanism that can be easily installed and assembled, is safe to use, and withstands vibrations and heavy loads. This bed lift mechanism has vertical track members that have a small enough slot for the movable bed brackets while eliminating potential pinch points, that include channels through which the movable brackets can move smoothly, and that can be securely fastened to the side walls of the trailer.

SUMMARY

According to an aspect and embodiment of the present invention, a lift mechanism is mounted to a support for raising and lowering a bed. The lift mechanism is attached to a side of the bed and includes at least one chain, at least one bracket connected to the chain, and a drive mechanism for controllably moving the chain to move the bracket and the bed between a respective raised position and lowered position. The at least one bracket includes a chain connector for connecting to the chain, a chain guide member receiving the chain and attached to the chain connector, and a bed support member attaching to the chain guide member and to the bed. At least a portion of the bed support member is inserted through the chain guide member.

The bed support member can include a bed mounting portion that attaches to the bed, and the bed mounting portion can be positioned at a bottom side of the bed support member.

The bed support member can include a bed mounting portion that attaches to the bed and an attachment portion that attaches to the chain guide member and is positioned above a vertical position of the bed mounting portion.

The chain guide member can include two guiding members that are separated by at least one spacer. One of the guiding members can receive the chain connector, and the other guiding member can receive the chain. The guiding members of the chain guide member can be U-shaped.

The bed support member can attach to the at least one spacer of the chain guide member and to the bed. The bed support member can include an attachment portion that attaches to the bed and a hook connecting to the at least one spacer of the chain guide member and positioned above a vertical position of the attachment portion.

The chain connector and the bed support member can be substantially perpendicular to each other. The chain connector can include a tongue that is inserted through at least one slot in the chain guide member. The tongue can be held in place in the at least one slot in the chain guide member via a frictional fit.

A frame assembly can be mounted to the support for the lift mechanism and can include at least one track member at least partially housing the chain, the bracket, and the drive mechanism. At least one of the track members of the frame assembly can include a slot along which the bed support member of the bracket is guided. The slot can have a width of less than or equal to 3⁄8".

A frame assembly can be mounted to the support for the lift mechanism and can include at least one track member at least partially housing the chain, the bracket, and the drive mechanism. At least one of the track members of the frame assembly can include a flange that is positioned against the support for the lift mechanism outside of a channel formed by the track member, and fasteners can be inserted into the flange to mount the track member to the support.

According to another aspect and embodiment of the present invention, the lift mechanism includes a lifting assembly attached to a side of the bed, and the lifting assembly includes at least one chain guided by at least one upper lifting sprocket and at least one lower lifting sprocket. At least one bottom bracket is connected to the chain, and the at least one bottom bracket includes a chain connector for connecting to the chain, a chain guide member receiving the chain and attached to the chain connector, and a bed support member attaching to the chain guide member and to the bed. At least a portion of the bed support member is inserted through the chain guide member. A drive mechanism transfers rotational motion to the upper lifting sprocket, and the upper lifting sprocket is operatively coupled to the lower lifting sprocket so that the rotational motion from the upper lifting sprocket is transferred to the lower lifting sprocket. The upper lifting sprocket and the lower lifting sprocket transfer the rotational motion to controllably move the bottom bracket and the bed between a respective raised position and lowered position.

According to another aspect and embodiment of the present invention, a lift mechanism is mounted to a support for raising and lowering a first bed and a second bed. The lift mechanism is attached to a side of the first and the second beds and includes at least one chain, at least one bottom bracket connected to the chain and attached to the first bed, at least one top bracket attached to the second bed, a drive mechanism for controllably moving the chain to move the bottom bracket and the bed between a respective raised position and lowered position, and a frame assembly at least partially housing the at least one chain, the at least one bottom bracket, the at least one top bracket, and the drive mechanism. The at least one top bracket includes a chain guide member for guiding the chain and a bed support member connecting to the at least one spacer of the chain guide member. The chain guide member includes two U-shaped members that are separated by at least one spacer, and each of the U-shaped members receives the chain. The bed support member is attached to the second bed. The at least one top bracket is supported by the at least one bottom bracket as the first and the second beds are lowered until the at least one top bracket is stopped by a stopper mounted to the frame assembly.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which:

FIG. 2 is a cross-sectional front view of a power side assembly of the bed lift mechanism of FIGS. 1A and 1B;

FIG. 4A is a cross-sectional side view of a first side of the power side assembly of the bed lift mechanism taken along the line 4A-4A of FIG. 2;

FIG. 5 is a cross-sectional top view of a vertical track member of the power side assembly of the bed lift mechanism taken along the line 5-5 of FIG. 2;

FIG. 6 is a cross-sectional side view of a second end of the power side assembly of the bed lift mechanism taken along the line 6-6 of FIG. 2;

FIG. 7 is a cross-sectional side view of a bottom end of the vertical track member the power side assembly of the bed lift mechanism taken along the line 7-7 of FIG. 2;

FIG. 8 is an exploded perspective view of a top bed bracket of the bed lift mechanism of FIGS. 1A and 1B;

FIG. 9 is an exploded perspective view of a bottom bed bracket of the bed lift mechanism of FIGS. 1A and 1B;

DETAILED DESCRIPTION OF THE PREFERRED EMBODIMENTS

Figure 1A:
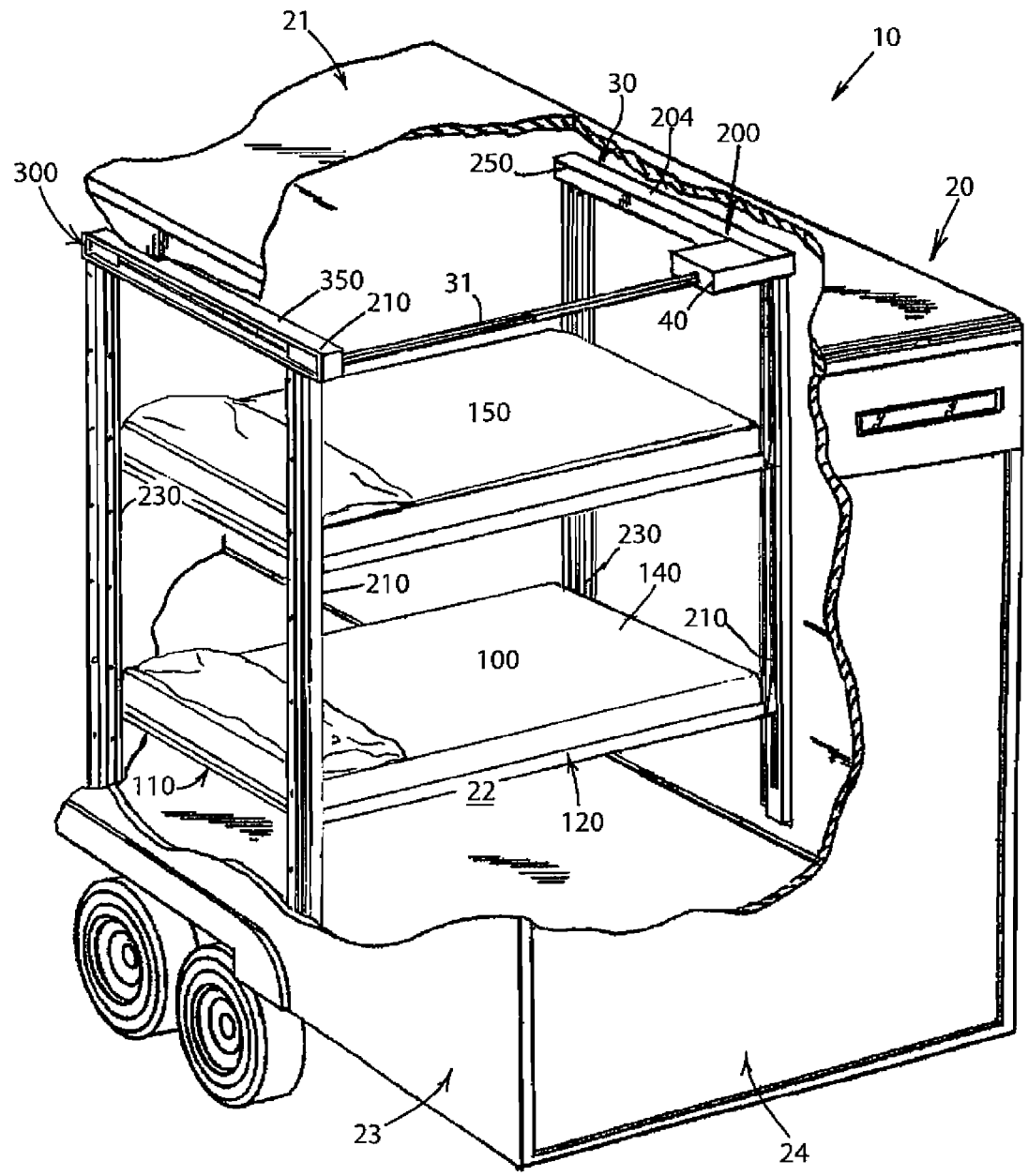
FIG. 1A is a perspective view of a toy trailer with a bed lift mechanism according to an embodiment of the present invention with a pair of beds in their lowered positions.

FIGS. 1A-10B illustrate an embodiment of a bed lift mechanism 30 in an exemplary toy trailer 10, which is an RV that has a rear section for storing one or more all-terrain vehicles (ATVs), dirt bikes, or other types of all-terrain, off-road, and recreational vehicles or motorized equipment. The RV can be any type of RV including motor homes and fifth wheel trailer type RVs. As previously mentioned, an RV for storing ATVs is often referred to as a "toy trailer" or "toy hauler." However, it will be understood that other motor vehicles besides an ATV can be stored in the RV.

The toy trailer typically includes a ramp (not shown) that opens into the rear section for allowing the ATVs to be loaded into the rear section of the toy trailer. The ramp drops down similarly to ramps in typical cargo trailers.

In most, if not all, toy trailers, a bed can be provided which can be raised and lowered over a height difference such as 9 feet. As used herein, the term "bed" refers not only to a support surface which is adapted and intended as a place for sleeping, but also applies more broadly to any base, substrate or structure that is intended to support an object. For example, the "bed" can be a cushioned or non-cushioned platform on which objects, such as a tool box, corrugated or plastic boxes or pallets, fungible goods, etc., can be placed and supported. In addition, the "bed" is not limited to being incorporated into a vehicle or other moving object, such as a ship. In other words, the bed and the accompanying drive mechanism of the present invention can equally be used in a stationary setting, such as a room of a building.

After the ATVs have been unloaded from the rear section of the toy trailer, the bed can be lowered and used for additional sleep accommodations. The ATVs can be loaded back into the rear section of the toy trailer when the beds are raised back into the original position.

There are a number of different type of RVs that can be adapted into a toy trailer depending upon a particular individual's needs, desires, and wishes. For example, one type of RV is a motor home that is a self-contained motorized RV that looks something like a bus and is often referred to as a "coach." This type of RV includes a number of different rooms and amenities that can provide superior comfort. Another type of RV is a travel trailer that is designed to be towed by a vehicle having hitch equipment for securely mating with the frame of the tow vehicle. Yet another type of RV is called a fifth wheel trailer (often referred to as a "fifth wheel") which is a trailer that is designed to be towed by a vehicle, such as a pickup truck, that is equipped with a special hitch in a bed portion of the tow vehicle because of their layouts and constructions, fifth wheel vehicles are particularly suited for conversion to a toy trailer.

FIGS. 1A-10B illustrate an RV adapted as a toy trailer 10; however, it will be understood that the present invention can be incorporated into various types of RVs, including those mentioned above. The toy trailer 10 includes a main cabin or housing (not shown), which includes the front portion of the toy trailer 10 and typically includes rooms, such as a master bedroom, kitchen, bathroom, closets, etc. A door (not shown) for entering the interior of the main cabin can be provided in this section.

The exemplary toy trailer 10 of FIGS. 1A-10B has at least one bed lift mechanism 30 which is controllably movable from a raised position to a lowered position for the purpose of providing a bed 100 in a rear section 20 of the toy trailer 10 after the ATVs have been removed. As shown in FIGS. 1A and 1B, the rear section 20 of the toy trailer 10 includes a ceiling section 21, a floor section 22, side walls 23, a front wall (not shown), a rear door 24, and a ramp (not shown) for loading and unloading the ATVs. The ramp can be dropped down to the ground after opening the rear door 24 and can be retracted back into the rear section 20 of the toy trailer 10 before closing the rear door 24.

The lift mechanism 30 functions as a mechanical drive mechanism for causing the controlled lifting and lowering of the bed 100. By actuating the lift mechanism 30, the bed 100 can be lowered from the raised position which can be as high as the ceiling section 21 to the lowered position which can be as low as the floor section 22 of the rear section 20 of the toy trailer 10. When the bed 100 is in the lowered position, the lift mechanism 30 can be actuated to raise the bed 100 from the lowered position to the raised position.

The bed lift mechanism 30 is incorporated into the rear section 20 of the toy trailer 10 for raising or lowering the bed 100; however, it is understood that the lift mechanism of the present invention is not limited to the rear section of a toy trailer but rather it can be incorporated into other rooms of the toy trailer, including those mentioned above and can be used in completely different settings, such as a room in a building or in a living quarters of a boat or similar type of vessel, such as a cruise liner.

The bed 100 includes a bed support bracket 110 which supports a bed frame 120. The bed support bracket 110 can be an L-shaped bracket as shown in the illustrated embodiment or it can be a flat plate. The bed frame 120 preferably supports a platform (not shown), and a mattress 140 is placed on top of the platform; however, the mattress 140 can be removed to use the space above the platform for storage.

The platform can be a section of plywood or some other type of sturdy, flat material fastened to the bed frame 120, so that the lift mechanism 30 can be used to raise and lower the platform. Supplies and other items can be stored on the platform. Thus, it is understood that the lift mechanism 30 of the present invention is not limited to being used as a personal bed but can be used as a storage shelf for lifting other types of loads.

The bed lift mechanism 30 of the present invention also allows a second bed 150 to be installed so that the bed lift mechanism 30 can be used to deploy the two separate beds 100, 150. The second bed 150 is positioned above the first bed 100 in the bed lift mechanism 30. Although the embodiment of the present invention shown in FIGS. 1A-10B and described herein includes two separate beds 100, 150, it is to be understood that the second bed 150 is optional and is not necessary to the invention. Thus, the bed lift mechanism 30 can be provided to deploy a single bed 100 or can be provided to deploy multiple beds 100, 150.

The bed lift mechanism 30 can be constructed in a number of different manners, using a number of different drive arrangements, including the following embodiment.

Bed Lift Mechanism

The embodiment of the chain-driven bed lift mechanism 30 shown in FIGS. 1A-10B, which is driven with four chains 220, 240 to raise and lower the beds 100, 150. It will be appreciated that each of the chains can also be referred to as a flexible drive member or a drive element that mates with and is entrained over other drive members.

Figure 1B:
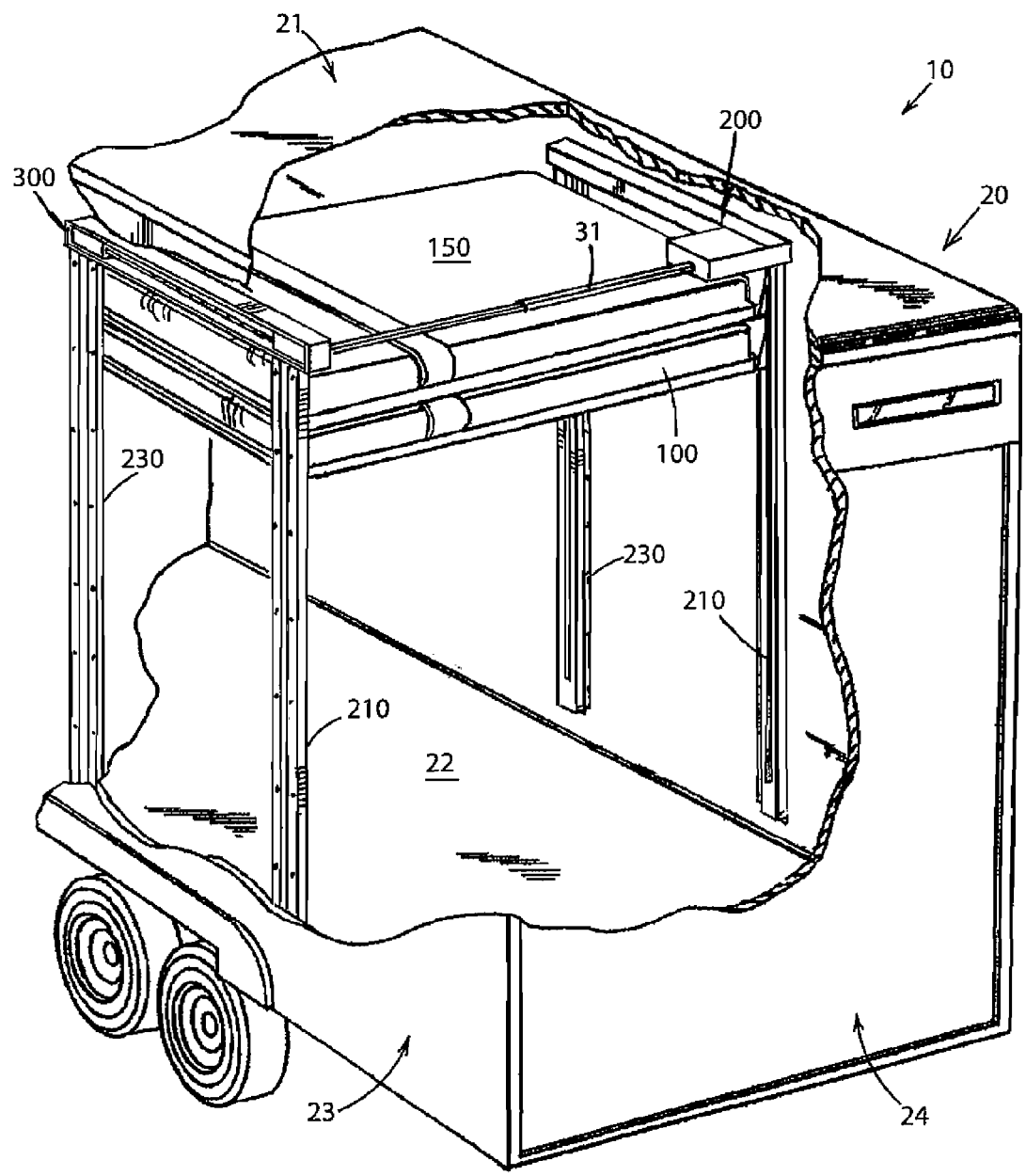
FIG. 1B is a perspective view of the toy trailer with the bed lift mechanism of FIG. 1A with the beds in their raised positions.

FIG. 1A is a perspective view of the toy trailer 10 with the bed lift mechanism 30 with the beds 100, 150 in a lowered position, and FIG. 1B is a perspective view of the toy trailer 10 with the beds 100, 150 in a raised position. The bed lift mechanism 30 includes a power side assembly 200 and a slave side assembly 300. The power and slave side assemblies 200, 300 are mounted to the opposite side walls 23 of the rear section 20 of the toy trailer 10.

Figure 3:
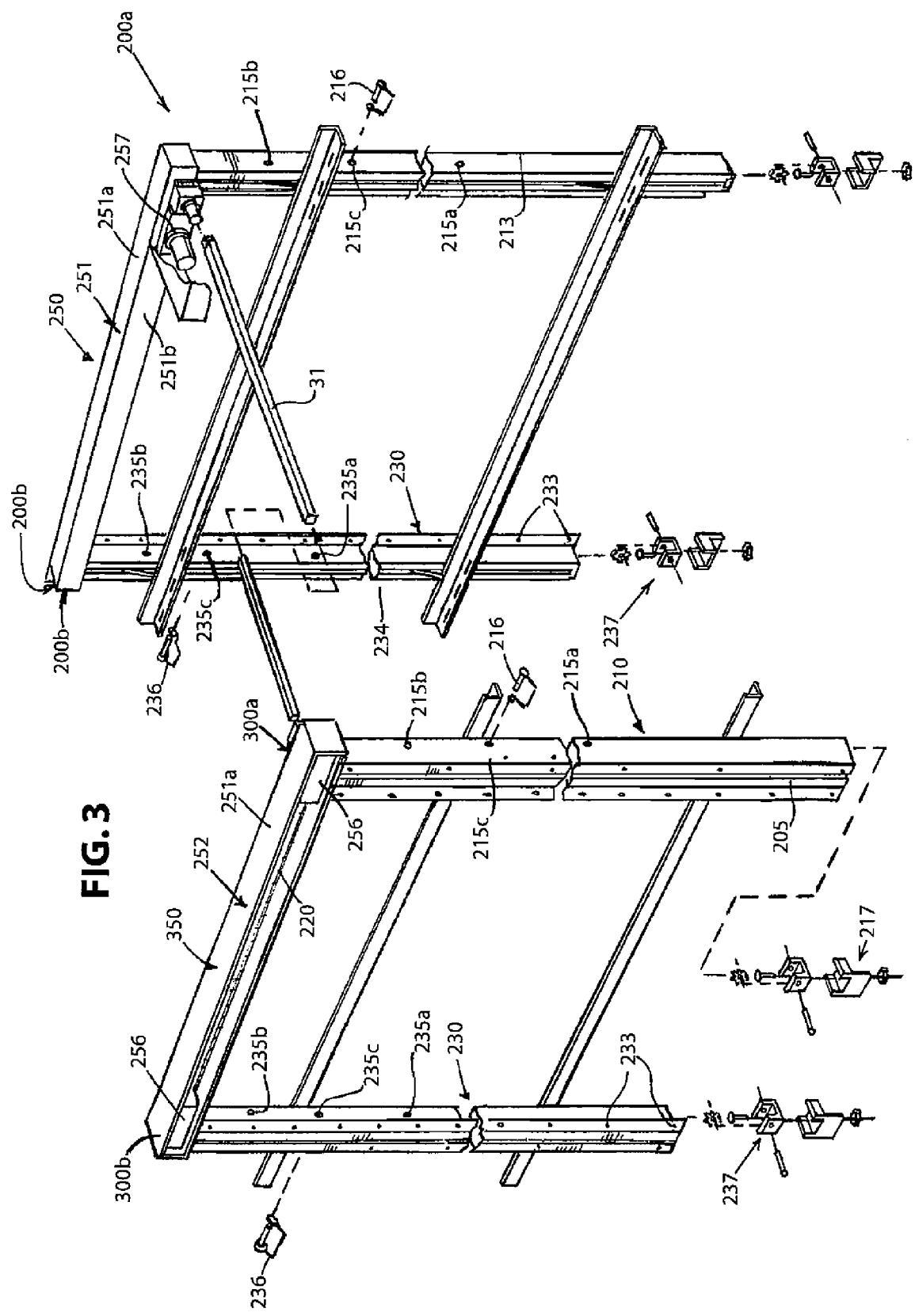
FIG. 3 is an exploded perspective view of the bed lift mechanism of FIGS. 1A and 1B.

The difference between the power side assembly 200 and the slave side assembly 300 is that the power side assembly 200 is directly connected to a drive mechanism 40, such as a worm gear assembly with a manual hand crank, a motor, or a motor with a manual override. The manual override can be a worm gear assembly as a self-locking system that eliminates the need for a break on the motor to keep the beds 100, 150 from drifting down. In the embodiment of the present invention shown in FIGS. 1A-10B, the drive mechanism 40 is a releasable drive mechanism such as described in U.S. Pat. No. 6,592,163, which is herein incorporated by reference. As shown in FIGS. 1A, 1B, and 3, the drive mechanism 40 can be enclosed in a cover 41 to create an attractive appearance.

The slave side assembly 300 is not connected directly to the drive mechanism 40 and is instead driven directly by the power side assembly 200. A telescoping cross shaft 31 is telescopically extended or retracted to be able to connect to both the power side assembly 200 and the slave side assembly 300. The length of the telescoping cross shaft 31 can be adjusted so that bed frames 120 of varying length can be mounted to the power side assembly 200 and the slave side assembly 300. The advantage of using a telescoping cross shaft is that it permits only one shaft to be manufactured or produced that is sized to fit and work well in a number of different bed assemblies of different dimensions.

Power Side Assembly

Figure 4B:
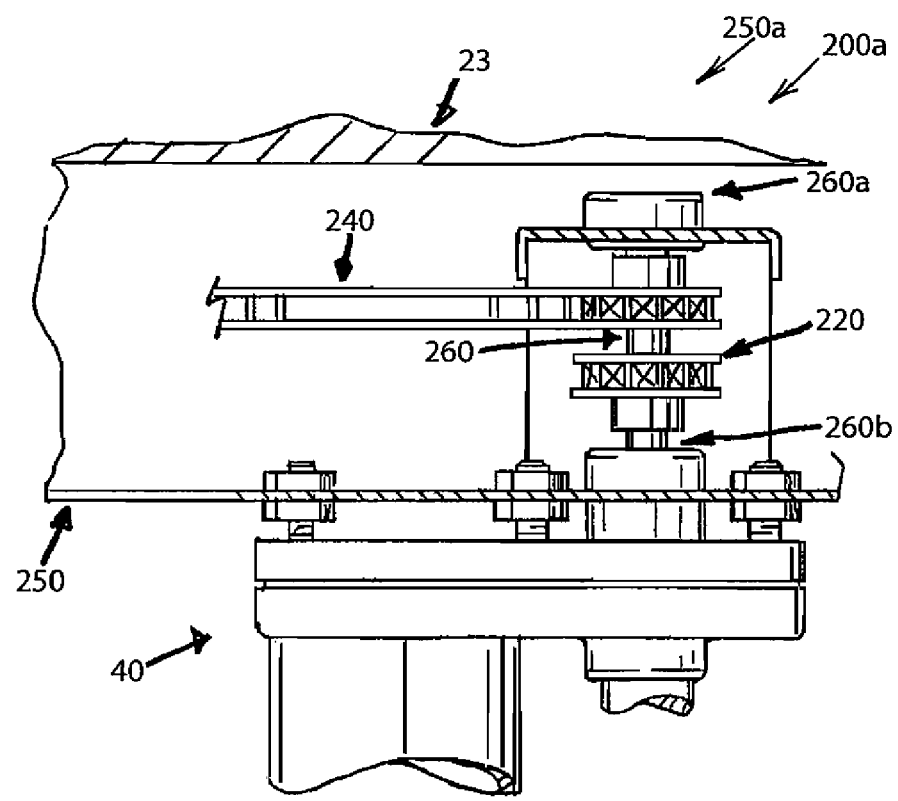
FIG. 4B is a cross-sectional top view of the first side of the power side assembly of the bed lift mechanism taken along the line 4B-4B of FIG. 2.

FIG. 2 is a cross-sectional front view of the power side assembly 200 of the bed lift mechanism 30; FIG. 3 is an exploded perspective view of the bed lift mechanism 30; FIG. 4A is a cross-sectional side view of the drive mechanism 40 on a first side 200a of the power side assembly 200 of the bed lift mechanism 30 taken along the line 4A-4A of FIG. 2; FIG. 4B is a cross-sectional top view of the drive mechanism 40 on the first side 200a of the power side assembly 200 of the bed lift mechanism 30 taken along the line 4B-4B of FIG. 2; and FIG. 6 is a cross-sectional side view of a second side 200b of the power side assembly 200 of the bed lift mechanism 30 taken along the line 6-6 of FIG. 2.

The first side 200a of the power side assembly 200 is located closer to the drive mechanism 40 than the second side 200b of the power side assembly 200.

The power side assembly 200 includes a frame 204. The frame 204 is mounted to the side wall 23 of the toy trailer 10 closest to the power side assembly 200 and remains stationary with respect to the beds 100, 150 as the beds 100, 150 are raised and lowered. The two beds 100, 150 are supported by the same frame 204 in the power side assembly 200. The frame 204 of the power side assembly 200 includes a pair of vertical track members 210, 230 and a cross bar 250.

The pair of vertical track members 210, 230 are provided in each of the power side assembly 200 and the slave side assembly 300; however, it is to be understood that for smaller sized beds, e.g., twin beds, a single vertical track member can be provided in each of the power side assembly 200 and the slave side assembly 300.

Vertical Track Members

FIG. 5 is a cross-sectional top view of the vertical track member 210, 230 of the power side assembly 200 of the bed lift mechanism 30 taken along the line 5-5 of FIG. 2. The first vertical track member 210 is positioned at the first side 200a of the power side assembly 200, and the second vertical member 230 is positioned at the second side 200b of the power side assembly 200.

Each of the first and the second vertical track members 210, 230 includes a top end 210a, 230a and a bottom end 210b, 230b. Preferably, the top ends 210a, 230a of the vertical track members 210, 230 are positioned close to the ceiling section 21 of the toy trailer 10 and the bottom ends 210b, 230b of the vertical track members 210, 230 are positioned close to the floor section 22 of the toy trailer 10.

Each of the vertical track members 210, 230 includes a question mark shaped (?-shaped) member 211, 231 that includes a pair of sides 211a, 231a, a base 211b, 231b, and a pair of flanges 211c, 231c connected to the sides 211a, 231a. Channels 212, 232 are formed by the sides 211a, 231a and bases 211b, 231b of the question mark shaped member 211, 231.

In the illustrated embodiment of the present invention, the member 211, 231 is question mark shaped shaped. However, it is to be understood that the member 211, 311 can also formed of other shapes incorporating a component with a question mark, U-, or C-shape or similar shape.

The difference between the U- and question mark shaped member is that in the U-shaped member, the flanges 211c, 231c are positioned outside the channel 212, 232 and are both fastened to the walls 23 of the trailer 10. However, in the question mark shaped member 211, 231, one of the flanges 211c, 231c is positioned inside the channel 212, 232 and one of the flanges is positioned outside the channel 212, 232. Therefore, as shown in FIG. 5, only one of the flanges 211c, 231c is visible when the bed lift mechanism 30 is installed in the trailer 10, thereby creating a more attractive outer appearance.

The flanges 211c, 231c positioned outside the channels 212, 232 are fastened to the side walls 23 of the trailer 10.

It is not necessary to fasten the flanges 211c, 231c inside the channels 212, 232 to the side walls 23 of the trailer 10 since it is sufficient to fasten one of the two flanges 211c, 231c of each question mark shaped member 211, 231. Fastening holes 213, 233 are formed at regularly spaced intervals along the flanges 211c, 231c positioned outside the channels 212, 232. Fasteners 213a, 213b, e.g., screws, are inserted through the fastening holes 213, 233 to mount the question mark shaped member 211, 231 to the side walls 23 of the toy trailer 10.

A slot 214, 234 is formed along the center of each of the bases 211b, 231b of the question mark shaped members 211, 231 of the vertical track members 210, 230. The slot 214, 234 extends along approximately the length of the base 211b, 231b. The slot 214, 234 can be formed of larger or thinner widths, and is preferably approximately 3/8" wide.

As shown in FIG. 5, tubing 205, e.g., square tubing, can be installed along the length of the channels 212, 232 of the vertical track members 210, 230. The tubing 205 is preferably formed of UHMW (ultra high molecular weight) plastic or another type of material that allows parts to glide smoothly against it. The tubing 205 is fastened, e.g., via screws, to each side 211a, 231a of the vertical track members 210, 230 toward the opening of the channels 212, 232 of the track members 210, 230. The tubing 205 is aligned flush against the side wall 23 of the trailer 10, thereby protecting the side wall 23 from being scratched by any moving parts in the channel 212, 232, such as the chains 220, 240.

Stoppers

As shown in FIG. 3, a plurality of stopper supporting holes 215, 235 are provided in the sides 211a, 231a of each vertical track member 210, 230. Each of the four vertical track members 210, 230 is provided with the stopper supporting holes 215, 235 and a single stopper 216, 236 for inserting into the stopper supporting holes 215, 235 selected by the user. Four stoppers 216, 236 are provided for the entire bed lift mechanism 30.

Each set of stopper supporting holes 215, 235 is provided at corresponding heights along each of the vertical track members 210, 230 to ensure that the bed supported by the stoppers 216, 236 is level when it is supported by the stoppers 216, 236.

The stoppers 216, 236 can include two clevis pins for inserting into the stopper supporting holes 215, 235 and a spring lock. The stoppers 216, 236 are formed from a material that is strong enough so that four stoppers 216, 236 and the drive mechanism 40 can at least partially support the weight of the bed and any weight that is intended to be supported by the bed, e.g., a person. Each setting of stopper supporting holes 215, 235 corresponding to a predetermined height of the bed 100, 150 includes a pair of holes 215, 235 formed in each of the opposing sides 211a, 231a of each vertical track member 210, 230 so that each stopper 216, 236 is inserted into the pair of holes 215, 235. The stoppers 216, 236 extend over the width of the channel 212, 232 of the track members 210, 230 and are positioned substantially perpendicular to the channel 212, 232.

Figure 10A:
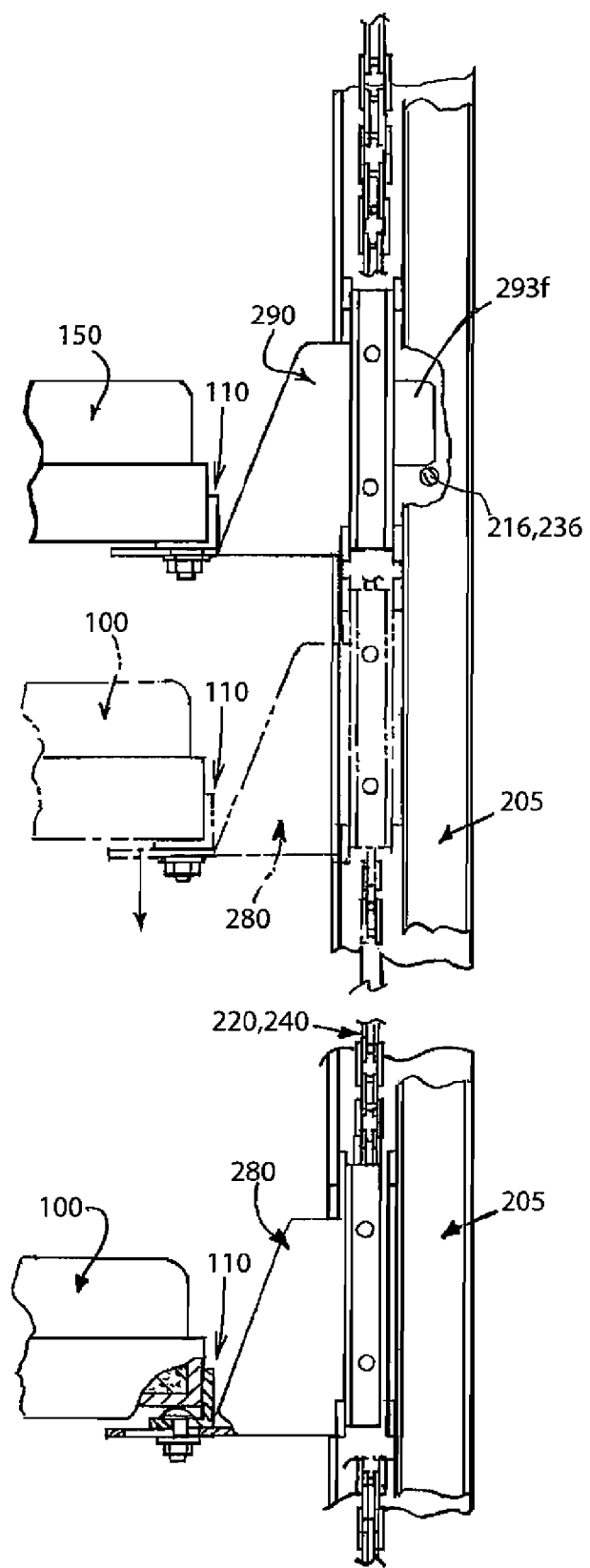
FIG. 10A is a side view of the power side assembly of the bed lift mechanism of FIGS. 1A and 1B as the beds are lowered to their bottommost lowered positions.

As shown in FIG. 3 and FIG. 10A described below, first stopper supporting holes 215a, 235a are provided at approximately the midpoint of the track members 210, 230. The stoppers 216, 236 placed inside the first stopper supporting holes 215a, 235a stop the downward movement of the (top) second bed 150, as described below. Thus, the positioning of the first stopper supporting holes 215a, 235a along the vertical track members 210, 230 determines the height of the bottommost lowered position of the second bed 150.

Figure 10B:
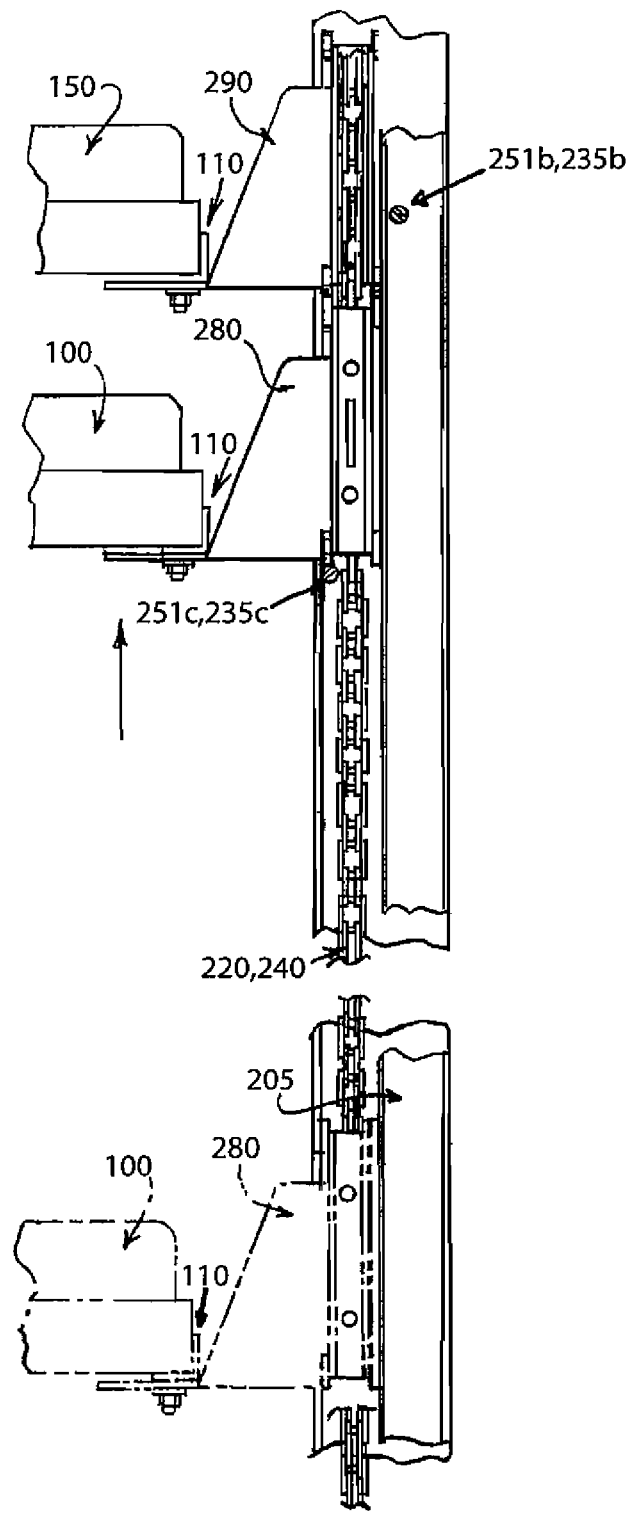
FIG. 10B is a side view of the power side assembly of the bed lift mechanism of FIGS. 1A and 1B as the beds are raised to their topmost raised positions.

As shown in FIG. 3 and FIG. 10B described below, second stopper supporting holes 215b, 235b are provided closer to the top ends 210a, 230a of the track members 210, 230. The exact positioning of the second stopper supporting holes 215b, 235b is described below. When the user wants to keep the second bed 150 at its topmost position, e.g., when only a single bed is necessary and the user wants increased headroom, the user raises the beds 100, 150 to their topmost raised positions and places the stoppers 216, 236 in the second stopper supporting holes 215b, 235b. The first bed 100 can then be moved to a desired lowered position while the second bed 150 is maintained at the top position.

Optionally, as shown in FIG. 3 and FIG. 10B described below, third stopper supporting holes 215c, 235c can also be provided closer to the top ends 210a, 230a of the track members 210, 230 and below the second stopper supporting holes 215b, 235b. The exact positioning of the third stopper supporting holes 251c, 235c is described below. When the user wants to keep both beds 100, 150 at their topmost raised positions, e.g., when traveling and/or when using the area below the beds for storage space, the user raises both beds 100, 150 to their topmost raised positions and places the stoppers 216, 236 in the third stopper supporting holes 215c, 235c. This is a safety mechanism to ensure that the beds 100, 150 do not fall in case the drive mechanism 40 fails or in case another part of the lift mechanism 30, e.g., one of the chains 220, 240, is damaged.

A cord (not shown) or another type of fastening device can be provided for attaching the stopper 216, 236 on one end thereof. The opposite end of the cord can be attached to the vertical track member 210, 230 or to the side wall 23 of the trailer 10. Thus, the stopper 216, 236 can be easily located and reinserted into the track member 210, 230 after the user removes the stopper 216, 236 and adjusts the positioning of the beds 100, 150.

Typical RVs are provided with a ladder (not shown) having a fixed height that is used for accessing the (top) second bed 150. With a ladder of fixed height, a single pair of first stopper supporting holes 215a, 235a in each track member 210, 230 is sufficient, as shown in the illustrated embodiment of the present invention. Alternatively, a plurality of first stopper supporting holes 215a, 235a can be provided at predetermined intervals, e.g., every 10 inches, if the trailer 10 is provided with a ladder of adjustable height. Each set of stopper supporting holes 215, 235 corresponds to a different height for the second bed 150. The user selects the particular set of stopper supporting holes 215, 235 for inserting the stoppers 216, 236 based on the preferred height of the second bed 150.

Cross Bar

The cross bar 250 is preferably positioned at the top ends 210a, 230a of the first and second vertical track members 210, 230 and spans at least a portion of the width of the beds 100, 150 between the two vertical track members 210, 230. A first end 250a of the cross bar 250 is disposed near the first vertical track member 210, and a second end 250b of the cross bar 250 is disposed near the second vertical track member 230.

The cross bar 250 includes a U-shaped member 251 that includes a pair of sides 251a joined by a base 251b. A channel 252 is formed by the sides 251a and base 251b of the U-shaped member 251. The cross bar 250 is positioned so that the channel 252 opens toward the side walls 23 of the toy trailer 10 to prevent objects from entering the cross bar 250 when the bed lift mechanism 30 is installed in the trailer 10.

In the illustrated embodiment of the present invention, the member 251 is U-shaped. However, it is to be understood that the member 251 can also formed of other shapes incorporating a component with a question mark, U-, or C-shape or similar.

The cross bar 250 is provided with fastening holes near each end 250a, 250b of the cross bar 250 to mount the ends 250a, 250b to a pair of top flanges (not shown) on the first and second vertical track members 210, 230. As shown in FIG. 2, at least one fastening hole is provided on each side 251a of the cross bar 250 at corresponding locations so that a bolt 253 can be inserted through each pair of holes to extend across the width of the cross bar 250 in the vertical direction, thereby providing increased stability between the cross bar 250 and the vertical track members 210, 230. Preferably, two bolts 253 are included at each end 250a, 250b of the cross bar 250.

Drive and Slave Shafts

The base 251b of the cross bar 250 is provided with shaft supporting holes for supporting a first end 260a of a drive shaft 260 at the first end 250a of the cross bar 150 and for supporting a first end 270a of a primary slave shaft 270 and a first end 275a of a secondary slave shaft 275 at the second end 250b of the cross bar 150. Shaft mounting brackets 256 are disposed inside the channels 252 of the cross bar 250 and include shaft mounting holes 256a that are positioned opposite to the shaft supporting holes in the base 251b of the cross bar 250 so that the drive shaft 260 and the slave shafts 270, 275 are positioned horizontally. The drive shaft 260 and the slave shafts 270, 275 span the depth of the cross bar 250.

At the first side 200a of the power side assembly 200, a primary drive sprocket 261 and a secondary drive sprocket 262 are non-rotatably disposed on the drive shaft 260. As shown in FIG. 4B, the drive sprockets 261, 262 are located between the base 251b of the cross bar 250 and the shaft mounting bracket 256 at the second side 200b of the power side assembly 200. As shown in FIG. 6, the primary drive sprocket 261 is located closer to the base 251b of the cross bar 250 and the secondary drive sprocket 262 is located closer to the shaft mounting bracket 256. The drive sprockets 261, 262 are non-rotatably supported by the drive shaft 260.

A second portion, e.g., a second end 260b of the drive shaft 260 is supported by the shaft mounting bracket 256 at the first end 250a of the cross bar 250, and second portions, e.g., second ends 270b, 275b of the slave shafts 270, 275 are supported by the shaft mounting bracket 256 at the second end 250b of the cross bar 250. With this configuration, the drive shaft 260 and the slave shafts 270, 275 are parallel to each other and are all perpendicular to the cross bar 250.

A drive mechanism mounting bracket 257 mounts the drive mechanism 40 onto the cross bar 250 close to the first side 200a of the power side assembly 200. The drive mechanism mounting bracket 257 is provided on the first end 250a of the cross bar 250 on the side of the base 251b of the cross bar 250 that faces the beds 100, 150.

The drive mechanism 40 is connected to the drive shaft 260 so that rotational motion is transferred from the drive mechanism 40 to the drive shaft 260. The rotational motion from the drive shaft 260 is transferred to the primary drive sprocket 261 and the secondary drive sprocket 262.

At the second side 200b of the power side assembly 200, a primary slave sprocket 271 is non-rotatably disposed on the primary slave shaft 270 and a secondary slave sprocket 276 is non-rotatably disposed on the secondary slave shaft 275. The primary and secondary slave sprockets 271, 276 are both located between the base 251b of the cross bar 250 and the shaft mounting bracket 256 at the first side 200a of the power side assembly 200.

Idler Sprockets

FIG. 7 is a cross-sectional side view of the bottom end 210b of the vertical track member 210 of the power side assembly 200 of the bed lift mechanism 30 taken along the line 7-7 of FIG. 2. It is to be understood that the bottom end 230b of the second vertical track member 230 is similar to the bottom end 210b of the first track member 210 shown in FIG. 7. Therefore, the components of the bed lift mechanism 30 at the bottom ends 210b, 230b of the first and second vertical track members 210, 230 are denoted by the same reference characters.

A bottom bracket 217, 237 is mounted over the bottom end 210b, 230b of each of the track members 210, 230. The bottom bracket 217, 237 includes at least two flanges 217a, 237a that slidingly fit over the two sides 211a, 231a of each of the bottom ends 210b, 230b of the track members 210, 230. Optionally, a flange (not shown) can be provided to slidingly fit over the base 211c, 231c of the track members 210, 230.

An idler sprocket supporting bracket 218, 238, such as an angle or U-shaped bracket, is fastened to a base of the bottom bracket 217, 237 by a tightener bolt 218a, 238a. An idler sprocket 219, 239 is rotatably supported by the bottom bracket 217, 237 via a clevis pin 218b, 238b that is prevented from axial movement, e.g., via cotter keys 218c, 238c inserted into the ends of the clevis pin 218b, 238b. The idler sprocket supporting bracket 218, 238 and the idler sprocket 219, 239 are enclosed inside the channel 212, 232 of the vertical track member 210, 232 via the bottom bracket 217, 237.

The chains 220, 240 pull the respective idler sprockets 219, 239 upward in the longitudinal direction of the vertical track members 210, 230 since the chains 220, 240 are guided under the idler sprockets 219, 239.

The tightener bolt 218a, 238a allows the user to adjust the positioning of the idler sprocket 219, 239 by adjusting the tightness of the connection between the base of the idler sprocket supporting bracket 218, 238 and the base of the bottom bracket 217, 237. As the connection between the base of the idler sprocket supporting bracket 218, 238 and the base of the bottom bracket 217, 237 is tightened, the idler sprocket 219, 239 is pulled downward, thereby tightening the slack of the respective chains 220, 240. As the connection between the base of the idler sprocket supporting bracket 218, 238 and the base of the bottom bracket 217, 237 is loosened, the idler sprocket 219, 239 is released, thereby increasing the slack of the respective chains 220, 240.

Primary Chain

A primary chain 220 is positioned inside the channel 212 of the first vertical track member 210. The primary chain 220 is supported and guided by the primary drive sprocket 261 on the drive shaft 260 and the idler sprocket 219 on the bottom end 210b of the first vertical track member 210. Thus, the primary chain 220 transfers motion from the primary drive sprocket 261 to the idler sprocket 219 in the first vertical track member 210.

A cutout 254 is provided on the lower side 251 of the cross bar 250 near the first end 250a and the second end 250b of the cross bar 250. The cutout 254 at the first end 250a of the cross bar 250 allows the primary chain 220 to move within the channel 212 of the first vertical track member 210 and the channel 252 of the cross bar 250.

The drive mechanism 40 transfers rotational motion to the drive shaft 260, which transfers the rotational motion to the primary and secondary drive sprockets 261, 262. The primary chain 220, which is guided over and around the primary drive sprocket 261, transfers the rotational motion from the drive sprocket 261 to the idler sprocket 219 at the bottom end 210b of the first vertical track member 210. The idler sprocket 219 is allowed to rotate via the clevis pin 218b mounted to the idler sprocket supporting bracket 218 at the bottom end 210b of the first vertical track member 210.

Thus, the primary chain 220 allows the idler sprocket 219 at the bottom end 210b of the first vertical track member 210 and the primary drive sprocket 261 to be turned synchronously.

Secondary Chain

A secondary chain 240 is positioned inside the channel 252 of the cross bar 250 and inside the channel 232 of the second vertical track member 230 on the second side 200b of the power side assembly 200. The secondary chain 240 is supported and guided, in counterclockwise order, by the primary slave sprocket 271 on the primary slave shaft 270, the idler sprocket 239 located in the bottom end 230b of the second vertical track member 230, the secondary slave sprocket 276 on the secondary slave shaft 275, and the secondary drive sprocket 262 on the drive shaft 260.

The primary and secondary slave sprockets 271, 276 create a bend in the secondary chain 240 so that the secondary chain 240 is configured in an inverted L-shape spanning the length of the cross bar 250 and over the length of the second vertical track member 230. The primary and secondary slave sprockets 271, 276 create a block and tackle arrangement that provides an advantage in lifting with the secondary chain 240. Furthermore, when the vertical portion of the secondary chain 240 is tightened by tightening the tightener bolts 238a at the bottom end 230b of the second vertical track member 230, the horizontal portion of the secondary chain 240 is also tightened.

The cutout 254 at the second end 250b of the cross bar 250 allows the secondary chain 240 to move within the channel 232 of the second vertical track member 230 and the channel 252 of the cross bar 250.

As shown in FIG. 4B, the drive mechanism 40 transfers rotational motion to the drive shaft 260, which transfers the rotational motion to the primary and secondary drive sprockets 261, 262. The primary and secondary drive sprockets 261, 262 are supported by the drive shaft 260 to turn synchronously with each other. The secondary chain 240 wraps around and receives rotational motion from the secondary drive sprocket 262.

When the secondary drive sprocket 262 (and the secondary chain 240) moves in the counterclockwise direction, the secondary chain 240 transfers the rotational motion from the secondary drive sprocket 262 to the primary slave sprocket 271. The primary slave sprocket 271 is allowed to rotate via the primary slave shaft 270 mounted to the shaft mounting bracket 256 and the base 251b at the second end 250b of the cross bar 250.

The secondary chain 240, which is guided over and around the primary slave sprocket 271, transfers the rotational motion from the primary slave sprocket 271 to the idler sprocket 239 at the bottom end 230b of the second vertical track member 230. The idler sprocket 239 is allowed to rotate via the clevis pin 238b mounted to the idler sprocket supporting bracket 238 at the bottom end 230b of the second vertical track member 230.

Then, the secondary chain 240, which is guided under and around the idler sprocket 239, transfers the rotational motion from the idler sprocket 239 to the secondary slave sprocket 276 at the second end 250b of the cross bar 250. The secondary slave sprocket 276 is allowed to rotate via the secondary slave shaft 275 mounted to the shaft mounting bracket 256 and the base 251b at the second end 250b of the cross bar 250.

Next, the secondary chain 240, which is guided over and around the secondary slave sprocket 276, transfers the rotational motion from the secondary slave sprocket 276 to the secondary drive sprocket 262 at the first end 250a of the cross bar 250.

When the secondary drive sprocket 262 (and the secondary chain 240) moves in the clockwise direction, the transfer of rotational motion is in the opposite direction than described above so that the rotational motion is transferred from the secondary drive sprocket 262 to the secondary slave sprocket 276, to the idler sprocket 239 at the bottom end 230b of the second vertical track member 230, to the primary slave sprocket 271, and back to the secondary drive sprocket 262.

Thus, the secondary chain 240 allows the idler sprocket 239 at the bottom end 230b of the second vertical track member 230 and the secondary drive sprocket 262 to be turned synchronously.

Bottom Bed Bracket

FIG. 9 is an exploded perspective view of a bottom bed bracket 280 of the bed lift mechanism 30. The primary and secondary chains 220, 240 each support one of the bottom bed brackets 280. Each of the bottom bed brackets 280 supports the first bed 100 and moves up and down within the channels 212, 232 of the vertical track members 210, 230. Thus, the rotation of the chains 220, 240 serves to lift or lower the bottom bed bracket 280, thereby lifting or lowering the first bed 100.

The respective chain 220, 240 is disposed within the bottom bed bracket 280 without damaging the bracket 280. The chains 220, 240 themselves are not formed as closed-loop chains since each chain 220, 240 includes a first end 220a, 240a and a second end 220b, 240b. The ends 220a, 220b, 240a, 240b of each of the chains 220, 240 are connected as described below to the bottom bed bracket 280. Therefore, a bottom bed bracket 280 connects the first end 220a of the primary chain 220 and the second end 220b of the primary chain 220 to form a closed loop, and another bottom bed bracket 280 connects the first end 240a of the secondary chain 240 and the second end 240b of the secondary chain 240 to form another closed loop.

The bottom bed brackets 280 are positioned with respect to the primary chain 220 and the secondary chain 240 so that all of the bottom bed brackets 280 are located at substantially the same height. Therefore, each corner of the first bed 100 is located at substantially the same height.

The bottom bed brackets 280 are positioned with respect to the primary chain 220 and the secondary chain 240, respectively, so that all of the bottom bed brackets 280 are lowered as the drive mechanism 40 rotates the drive shaft 260 in a first direction, e.g., the direction of arrow A as shown in FIG. 2, and all of the bottom bed brackets 280 are raised as the drive mechanism 40 rotates the drive shaft 260 in a second direction, e.g., the direction of arrow B, which is opposite arrow A.

The bottom bed brackets 280 are also positioned with respect to the respective chains 220, 240, respectively, so that the chains 220, 240 rotate to lower the bottom bed brackets 280 at the same time and at the same speed as the drive shaft 260 rotates in the first direction. As the drive shaft 260 rotates in the opposite second direction, the chains 220, 240 rotate to raise the bottom bed brackets 280 at the same time and at the same speed.

Each of the bottom bed brackets 280 includes a chain connector 281, a chain guide member 282, and a bed support member 283.

The chain connector 281 includes a top end 281a, a bottom end 281b, chain couplers 281c, and a tongue 281d protruding from one side. The tongue 281d is approximately 2" long (in the lengthwise direction of the chain connector 281) and the chain connector 281 is a generally flat piece that is, for example, approximately ¼" thick. A chain coupling hole (not shown) is formed in the respective top end 281a and bottom end 281b of the chain connector 281. The first chain coupling hole is vertically aligned with and positioned above the second chain coupling hole along the lengthwise direction of the chain connector 281. The first end 220a, 240a of each of the chains 220, 240 is connected via the chain coupler 281c, e.g., a pin, to the first chain coupling hole. The second end 220b, 240b of each of the chains 220, 240 is connected via another chain coupler 281c to the second chain coupling hole.

The chain guide member 282 has a length that is approximately equal to the chain connector 281 and includes two U-shaped members 282a which are separated by spacers 282b. The U-shaped members 282a form two channels 282c, which are separated by the spacers 282b. The U-shaped members 282a open toward the respective sides 211a, 231a of the vertical track members 210, 230. The chain connector 281 is positioned in the channel 282c of one of the U-shaped members 282a, and a portion of the chain 220, 240, whose ends are connected to the chain connector 281, is positioned in the opposite channel 282c.

The spacer 282b of the present invention is a clevis pin which is inserted via a friction fit into opposing holes in the U-shaped members 282a and held in place by a cotter key. The spacer 282b ensures that a predetermined gap, e.g., ¼", is maintained between the U-shaped members 282a.

The base of each U-shaped member 282a includes the pair of holes for receiving the spacers 282b and a slot 282d, e.g., approximately ¼" by 2", positioned between the two holes. To assemble the bottom bed bracket 280, the tongue 281d of the chain connector 281 is inserted through the slots 282d of the two U-shaped members 282a which are attached by the spacers 282b. The U-shaped members 282a and the chain connector 281 are precisely machined to form a close fit, and the tongue 281d is formed so that it is long enough to extend through both slots 282d of the U-shaped members 282a.

The chain connector 281 can include cutouts 281e located near the spacers 282b of the chain guide member 282 to ensure that the chain connector 281 does not contact the ends of the spacers 282b.

The bed support member 283 is attached to the chain guide member 282 so that the bed support member 283 is generally perpendicular to the chain connector 281. The bed support member 283 includes an attachment portion 283a that attaches to the spacers 282b in the chain guide member 282. To assemble the bottom bed bracket 280, the attachment portion 283a is inserted into the gap between the U-shaped members 282a formed by the spacers 282b.

The attachment portion 283a includes a hook 283b near a top end and a curved receptor 283c near a bottom end. Both the hook 283b and the curved receptor 283c are formed with openings that face the insertion direction of the attachment portion 283a of the bed support member 283. The hook 283b is formed with an inner diameter that is precisely machined to have a slightly larger diameter, e.g., ⁵⁄₁₆", than the outer diameter, e.g., ¼", of the spacer 282b to maintain a close fit.

The attachment portion 283a is attached to the chain guide member 282 by sliding the hook 283b around the spacer 282b at the top end of the chain guide member 282. The bottom end of the attachment portion 283a can pivot around the spacer 282b at the top end of the chain guide member 282 until the curved receptor 283c at the bottom end of the attachment member 283a is positioned near the spacer 282b at the bottom end of the chain guide member 282, as shown in FIG. 9. The curved receptor 283c includes a curved surface 283d at a top edge thereof so that when the curved receptor 283c contacts the spacer 282b at the bottom end of the chain guide member 282, the curved surface 283d slides smoothly against the spacer 282b until the spacer 282b is received by the curved receptor 283c.

The attachment portion 283a also includes a generally rectangular cutout 283e. The cutout 283e ensures that the attachment portion 283a does not contact the tongue 281d of the chain connector 281 when it is inserted through the slots 282d of the two U-shaped members 282a.

When the hook 283b and the curved receptor 283c of the attachment portion 283a are connected to the spacers 282b, the bed support member 283 is securely attached to the chain guide member 282. Gravitational forces, the weight of the bed, and other forces are unable to disconnect the bed support member 283 to the chain guide member 282.

The bed support member 283 also includes a mounting plate 284 which is connected perpendicularly to the attachment portion 283a at the bottom edge thereof so that the mounting plate 284 is positioned horizontally. The mounting plate 284 includes a slot 284a for mounting the bed support bracket 110 of the first bed 100 using fasteners, e.g., bolts.

Top Bed Bracket

FIG. 8 is an exploded perspective view of a top bed bracket 290 of the bed lift mechanism 30. The top bed bracket 290 allows the second bed 150 to be deployed by the bed lift mechanism 30 with the first bed 100 while both beds 100, 150 are supported by the same frame 204 in the power side assembly 200. The second bed 150 is positioned above the first bed 100 in the bed lift mechanism 30.

The respective chain 220, 240 is disposed within the top bed bracket 290 without damaging the bracket 290. Unlike the bottom bed brackets 280, the top bed brackets 290 are not attached to the respective chains 220, 240. The top bed brackets 290 are supported by the bottom bed brackets 280 within the channels 212, 232 of the vertical track members 210, 230 so that the top bed brackets 290 rest on top of the respective bottom bed brackets 280 as the beds 100, 150 are lowered from the topmost raised positions.

Since the top bed brackets 290 are supported by the bottom bed brackets 280, the top bed brackets 290 are positioned with respect to the chains 220, 240 so that all of the top bed brackets 290 are located at substantially the same height. Therefore, each corner of the second bed 150 is located at substantially the same height.

Each of the top bed brackets 290 includes a chain guide member 292 and a bed support member 293. The chain guide member 292 of the top bed bracket 290 is formed substantially identically to the chain guide member 282 of the bottom bed bracket 280 except that the chain guide member 292 of the top bed bracket 290 does not include a slot (282*d*) since the top bed bracket 290 does not include a chain connector (281).

The chain guide member 292 includes two U-shaped members 292*a* which are separated by spacers 292*b*. The U-shaped members 292*a* form two channels 292*c*, which are separated by the spacers 292*b*. The channels 292*c* open toward the respective sides 211*a*, 231*a* of the vertical track members 210, 230. Two portions of the chain 220, 240 near each of the respective sides 211*a*, 231*a* of the track members 210, 230 are positioned in each of the opposite channels 292*c*.

The spacer 292*b* is identical to the spacer 282*c* of the bottom bed bracket 280 and is a clevis pin which is inserted via a friction fit into opposing holes in the U-shaped members 292*a* and held in place by a cotter key. The spacer 292*b* ensures that a predetermined gap, e.g., ¼", is maintained between the U-shaped members 292*a*. The base of each U-shaped member 292*a* includes the pair of holes for receiving the spacers 292*b*.

The bed support member 293 of the top bed bracket 290 is attached to the bed support bracket 290 so that the bed support member 293 in substantially the same manner as in the bottom bed bracket 280. The bed support member 293 includes an attachment portion 293*a* that attaches to the spacers 292*b* in the chain guide member 292. To assemble the top bed bracket 290, the attachment portion 293*a* is inserted into the gap between the U-shaped members 292*a*.

The attachment portion 293*a* includes a hook 293*b* near a top end and a curved receptor 293*c* near a bottom end. Both the hook 293*b* and the curved receptor 293*c* are formed with openings that face the insertion direction of the attachment portion 293*a*. The hook 293*b* is formed with an inner diameter that is precisely machined to have a slightly larger diameter, e.g., ⁵⁄₁₆", than the outer diameter, e.g., ¼", of the spacer 292*b*. The attachment portion 293*a* is attached to the chain guide member 292 as described above for the bottom bed bracket 280.

The attachment portion 293*a* of the top bed bracket 290 also includes a tongue 293*f*, e.g., a rectangular protrusion, that extends toward the insertion direction of the attachment portion 293*a*. When the bed support member 293 is attached to the chain guide member 292, the tongue 293*f* extends outward from the gap between the U-shaped members 292*a* of the chain guide member 292 by a predetermined length, e.g., about ¾", as shown in FIG. 8. The tongue 293*f* is located between the hook 293*b* and the curved receptor 293*c*.

As the beds 100, 150 are lowered, the top bed brackets 290 stop moving downward when the tongues 293*f* contact the respective stoppers 216, 236 in the vertical track members 210, 230. Thus, as shown in FIG. 10A, each of the tongues 293*f* extends far enough past the gap between the U-shaped members 292*a* of the chain guide member 292 so that the tongue 293*f* can reach the corresponding stopper 216, 236, thereby allowing the second bed 150 to stop at the predetermined bottommost lowered position as determined by the location of the stoppers 216, 236. The tongues 293*f* are also dimensioned to support at least partially the weight of the second bed 150.

The bed support member 293 also includes a mounting plate 294 which is connected perpendicularly to the attachment portion 293*a* at the bottom edge thereof so that the mounting plate 294 is positioned horizontally. The mounting plate 294 includes a slot 294*a* for mounting the bed support bracket 110 of the second bed 150 using fasteners, e.g., bolts.

The U-shaped members 282*a*, 292*a* of the chain guide members 282, 292 of the bottom and top bed brackets 280, 290 include multiple glide plug mounting holes for mounting multiple glide plugs (wear tabs) 285, 295. The glide plugs 285, 295 are preferably formed of UHMW (ultra high molecular weight) plastic or another type of material that can glide smoothly against the base 211*b*, 231*b* of the vertical track members 210, 230 and against the tubing 205 in the channels 212, 232 in the vertical track members 210, 230.

The tubing 205 is provided in pairs for each vertical track member 210, 230 so that there is a space therebetween through which the tongue 293*f* can pass. Furthermore, holes 205*a* (FIG. 10B) are provided in the tubing 205 corresponding to the locations of the stopper supporting holes 215*a*, 215*b*, 235*a*, 235*b* to allow the stopper 216, 236 to pass through the channel 212, 232 of the vertical track members 210, 230. Holes 205*a* in the tubing 205 are not necessary for coinciding with the stopper supporting holes 215*c*, 235*c* for allowing the stopper 216, 236 to support the bottom bed brackets 280. As shown in FIG. 10B, the bottom bed brackets 280 do not include a tongue, such as the tongue 293*f* of the top bed bracket 290. Therefore, to support the bottom bed brackets 280, the stopper supporting holes 215*c*, 235*c* are positioned to allow the stopper 216, 236 to contact the chain guide member 282. More specifically, as shown in FIG. 10B, the stopper supporting holes 215*c*, 235*c* for supporting the bottom bed bracket 280 are positioned closer to the base 211*b*, 231*b* of the question mark shaped member 211, 231 than the stopper supporting holes 215*a*, 215*b*, 235*a*, 235*b* for supporting the top bed bracket 290 and do not require holes in the tubing 205.

The attachment portions 283*a*, 293*a* of the bed support members 283, 293 of the bottom and top bed brackets 280, 290 are thinner than the width of the slot 214, 234 of the vertical track members 210, 230 so that the bottom and top bed brackets 280, 290 can be raised and lowered without interruption from any contact of the bed brackets 280, 290 and the vertical track members 210, 230.

The primary chain 220 is configured as follows starting from the second end 220*b* and ending at the first end 220*a*. The second end 220*b* of the secondary chain 220 is connected to the bottom end 281*b* of the chain connector 281 in the bottom bed bracket 280 positioned in the first vertical track member 210. The primary chain 220 extends down the channel 212 of the first vertical track member 210, under the idler sprocket 219, back up the first vertical track member 210, through the channel 282*c* of the chain guide member 282 in the bottom bed bracket 280 opposite the channel 282*c* housing the chain connector 281, through one of the channels 292*c* of the chain guide member 292 of the top bed bracket 290, over the top of the primary drive sprocket 261, down the channel 212 of the first vertical track member 210, and through the opposite channel 292*c* of the chain guide member 292 of the top bed bracket 290. Then, the first end 240*a* of the primary chain 240 connects to the top end 281*a* of the chain connector 281 in the bottom bed bracket 280.

The secondary chain 240 is configured as follows starting from the second end 240*b* and ending at the first end 240*a*. The second end 240*b* of the secondary chain 240 is connected to the bottom end 281*b* of the chain connector 281 in the bottom bed bracket 280 positioned in the second vertical track member 230. The secondary chain 240 extends down the channel 232 of the second vertical track member 230, under the idler sprocket 239 in the second vertical track member 230, back up the second vertical track member 230, through the channel 282c of the chain guide member 282 in the bottom bed bracket 280 opposite the channel 282c housing the chain connector 281, through one of the channels 292c of the chain guide member 292 of the top bed bracket 290, over the top of the primary slave sprocket 271, through the channel 252 of the cross bar 250 to the first end 250a thereof, around the secondary drive sprocket 262, through the channel 252 of the cross bar 250 to the second end 250b thereof, over the secondary slave sprocket 276, down the channel 232 of the second vertical track member 230, and through the opposite channel 292c of the chain guide member 292 of the top bed bracket 290. Then, the first end 240a of the secondary chain 240 connects to the top end 281a of the chain connector 281 in the bottom bed bracket 280.

Bed Support Bracket

The bed support bracket 110 for each of the beds 100, 150 is mounted to the respective slots 284a, 294a in the mounting plates 284, 294 of the bottom bed bracket 280 and the top bed bracket 290. The slots 284a, 294a in the mounting plates 284, 294 extend away from the vertical track members 210, 230 and the side wall 23 of the trailer 10. The slots 284a, 294a are generally perpendicular to the surface of the side walls 23 and allow the assembler of the bed lift mechanism 30 to align the bed support bracket 110 properly with respect to the mounting plates 284, 294 before fastening the bed support bracket 110 to the mounting plates 284, 294.

The length of the slots 284a, 294a in the mounting plates 284, 294 can vary, e.g., approximately 1" long. The slots 284a, 294a allow free movement to adjust the position of both ends of the bed 100, 150.

The fasteners, e.g., bolt and nut, connecting the bed support bracket 110 to the mounting plates 284, 294 can be loosened a little when the trailer 10 is traveling. In this state, if the distance between the side walls 23 varies along the width of the beds 100, 150, then the fasteners can slide along the slots 284a, 294a in the mounting plates 284, 294 to accommodate for any difference in the distance between the side walls 23 of the trailer 10, especially when the walls 23 are not completely parallel.

Slave Side Assembly

The first side 300a of the slave side assembly 300 is opposite to the first side 200a of the power side assembly 200, and a second side 300b of the slave side assembly 300 is opposite to the second side 200b of the power side assembly 200.

The components of the slave side assembly 300 that are identical to the corresponding parts of the power side assembly 200 are denoted by identical reference characters and will not be described in detail.

The difference between the slave side assembly 300 and the power side assembly 200 is that the power side assembly 200 includes the drive mechanism 40, such as a crank or a motor. Rotational motion is then supplied to the slave side assembly 300 via the telescoping shaft 31, which connects the slave side assembly 300 to the power side assembly 200.

Telescoping Shaft

The telescoping shaft 31 is mounted to the respective second end 260b of the drive shaft 260 at the first side 200a of the power side assembly 200 using a fastener such as a bolt and hex nut. The telescoping shaft 31 can be extended telescopically to connect the drive shaft 260 of the power side assembly 200 to a drive shaft 260 of the slave side assembly 300, and the length of the telescoping shaft 31 can be fixed using a fastener such as a bolt and hex nut. The drive shaft 260 of the slave side assembly 300 is identical to the drive shaft 260 in the power side assembly 200 except that the drive shaft 260 of the slave side assembly 300 is not connected directly to a drive mechanism, since the slave side assembly 300 does not include a separate drive mechanism.

The telescoping shaft 31 is shown as a square shaft in FIGS. 1A, 1B, 3 and 4; however, it is understood that the telescoping shaft 31 can be formed having a cross section with a different shape as long as it can be extended or retracted telescopically to connect the power side assembly 200 to the slave side assembly 300. Thus, the length of the telescoping shaft 31 can be adjusted so that bed frames of varying length can be included in the bed lift mechanism 30.

A cross bar 350 in the slave side assembly 300 is similar to the cross bar 250 in the power side assembly 200 except that the cross bar 350 in the slave side assembly 300 does not include a drive mechanism mounting bracket since the slave side assembly 300 does not include a drive mechanism.

FIGS. 1A, 1B, and 3 show a bed lift mechanism 30 with a single telescoping shaft 31; however, it is to be understood that the bed lift mechanism 30 can include two telescoping shafts 31. One telescoping shaft can extend telescopically to connect the drive shaft 260 of the power side assembly 200 to the drive shaft 260 of the slave side assembly 300, and the other telescoping shaft can extend telescopically to connect, for example, the primary slave shaft 270 of the power side assembly 200 to the primary slave shaft 270 of the slave side assembly 300.

Installation

The installation of the bed lift mechanism 30 in the trailer 10 will now be described.

First, the power side assembly 200, which is constructed as described above without the telescoping shaft 31, is fastened onto one of the side walls 23 of the trailer 10, and the slave side assembly 300 is fastened onto the opposite side wall 23 of the trailer 10. Thus, the power side assembly 200 and the slave side assembly 300 are installed in the trailer 10 before installing the bed frame 120.

Then, the telescoping shaft 31 is fastened to the second end 260b of the drive shaft 260 of the power side assembly 200. The length of the telescoping shaft 31 is adjusted so that the free end of the telescoping shaft 31 can be fastened to the second end 260b of the drive shaft 260 of the slave side assembly 300. It is to be understood that alternatively the telescoping shaft 31 can be connected to the slave side assembly 300 before the power side assembly 200.

The bed frame 120 is positioned on the bed support brackets 110 in the power side assembly 200 and in the slave side assembly 300, and then the bed frame 120 is fastened in place.

If a motor is provided, the motor is hooked up to a power source before operating the bed lift mechanism 30.

Operation

The operation of the lift mechanism 30 is illustrated in FIGS. 10A and 10B and will now be described with the beds 100, 150 being lowered to their bottommost lowered positions.

FIG. 10A is a side view of the power side assembly 200 of the bed lift mechanism 30 as the beds 100, 150 are lowered to their bottommost lowered positions. The first bed 100 is shown in dashed lines at an intermediate position when the second bed 150 has been stopped by the stoppers 216, 236 at its bottommost lowered position. While the second bed 150 is held in position by the stoppers 216, 236, the first bed 100 continues moving downward until it reaches its bottommost lowered position, which is shown in solid lines. The beds 100, 150 in their bottommost lowered positions are shown in solid lines.

When a user wants to lower the beds 100, 150, the user activates the lift mechanism 30 by operating the drive mechanism 40, which is attached to the power side assembly 200. As the user activates the drive mechanism 40, the drive shaft 260 connected to the drive mechanism 40 rotates, thereby rotating the primary and secondary drive sprockets 261, 262 disposed on the drive shaft 260.

The primary drive sprocket 261 drivingly engages the primary chain 220, which encircles the primary drive sprocket 261 and the idler sprocket 219 at the bottom end 210*b* of the first vertical track member 210.

Since the primary and secondary drive sprockets 261, 262 are non-rotatably disposed on the drive shaft 260, the rotation of the drive shaft 260 causes the primary and secondary drive sprockets 261, 262 to rotate together.

The secondary drive sprocket 262 drivingly engages the secondary chain 240, which encircles the secondary drive sprocket 262, the primary slave sprocket 271, the idler sprocket 239 at the bottom end 230*b* of the second vertical track member 230, and the secondary slave sprocket 276. The rotational motion from the secondary chain 240 causes the primary slave sprocket 271, the idler sprocket 239, and the secondary slave sprocket 276 to rotate.

The rotation of the drive shaft 260 in the power side assembly 200 causes the rotation of the primary drive sprocket 261, the first idler sprocket 219, the secondary drive sprocket 262, the primary slave sprocket 271, the secondary slave sprocket 276, and the second idler sprocket 239 at the same rate and at the same time. Thus, the bottom bed brackets 280 connected to the primary chain 220 and the secondary chain 240 are also raised or lowered at the same rate and at the same time.

One end of the telescoping shaft 31 is connected to the second end 260*b* of the drive shaft 260. The opposite end of the telescoping shaft 31 is fastened to the second end 260*b* of the drive shaft 260 in the slave side assembly 300. The telescoping shaft 31 transfers the rotational motion from the drive mechanism 40 via the drive shaft 260 of the power side assembly 200 to the drive shaft 260 of the slave side assembly 300. The primary drive sprocket 261 on the drive shaft 260 of the slave side assembly 300 is driven by the rotational motion of the drive mechanism 40 in the power side assembly 200 via the telescoping shaft 31.

At the topmost raised positions of the beds 100, 150 (FIGS. 1B and 10B), the top bed brackets 290 rest on top of the respective bottom bed brackets 280. Specifically, the bottom end of the chain guide member 292 of the top bed bracket 290 rests against the top end of the chain guide member 282 of the bottom bed bracket 280. The dimensions of the bed brackets 280, 290, e.g., the length of the chain guide member 282, 292 or of the bed support members 283, 293 of the bed brackets 280, 290, are preferably configured so that at least a 1" gap is maintained between the two beds 100, 150. This 1" gap eliminates a potential pinch point between the exposed bed support members 283, 293 of the bottom and top bed brackets 280, 290.

The bottom bed brackets 280 and the top bed brackets 290 are aligned so that the chains 220, 240 pass through the channels 282*c*, 292*c* within the bottom bed brackets 280 and the top bed brackets 290. As the chains 220, 240 lower the bottom bed brackets 280 along the vertical track members 210, 230, the top bed brackets 290 are also lowered since they rest on top of the bottom bed brackets 280.

As described above, the bottom bed brackets 280 are lowered synchronously as the drive mechanism 40 rotates the drive shaft 260 in the first direction, e.g., the direction of arrow A as shown in FIG. 2. As the bottom bed brackets 280 are lowered from the topmost raised position, the top bed brackets 290 are also lowered.

As the second bed 150 is lowered, the top bed bracket 290 can be lowered far enough so that the tongue 293*f* in the top bed bracket 290 rests against the stopper 216, 236 positioned in the stopper supporting holes 215*a*, 235*a* in the vertical track member 210, 230, as shown in FIG. 10A. Thus, the stopper 216, 236 prevents the tongue 293*f* in the top bed bracket 290 connected to the second bed 150 from lowering farther than the height set by the stopper 216, 236 in the stopper supporting holes 215*a*, 235*a*. The first bed 100 is shown in FIG. 10A in dashed lines at an intermediate position after the second bed 150 has been stopped by the stoppers 216, 236 at its bottommost lowered position.

As the first bed 100 is lowered, the first bed 100 can be lowered past the stopper 216, 236 in the vertical track member 210, 230 since the bottom bed bracket 280 is formed without a tongue or other protrusion to stop its downward movement. Therefore, the bottom bed bracket 280 is able to bypass the stopper 216, 236 and can be lowered farther than the height of the stoppers 216, 236 in the stopper supporting holes 215*a*, 235*a* in the vertical track members 210, 230.

As shown in FIG. 10A, the first bed 100 continues descending downward toward its bottommost lowered position, which is shown in solid lines. The bottom bed brackets 280 continue moving downward along the vertical track members 210, 230 past the position of the stoppers 216, 236 in the stopper supporting holes 215*a*, 235*a*.

The beds 100, 150 are shown in FIG. 10A in solid lines at their bottommost lowered positions. The first bed 100 reaches its bottommost lowered position when it is prevented from moving farther, e.g., after contacting a bottom edge of the slot 214, 234 in the vertical track members 210, 230 or when the user has turned off the drive mechanism 40.

At the position shown in FIG. 10A, the first bed 100 has also reached its bottommost lowered position while the second bed 150 has remained at its bottommost lowered position. However, the first bed 100 can be lowered to and used at any position along the slots 214, 234 of the track members 210, 230.

After the first bed 100 has been lowered to its preferred height while the second bed 150 remains at its bottommost lowered position, the user can activate the drive mechanism 40 to lift the beds 100, 150 back to their original raised positions. The operation of the bed lift mechanism 30 to raise the beds 100, 150 is the same as for the lowering operation described above except that the drive shaft 260 is rotated in the opposite direction. As a result, the gears rotate in the opposite direction, thereby causing the lift mechanism 30 to raise the beds 100, 150.

FIG. 10B is a side view of the power side assembly 200 of the bed lift mechanism 30 as the beds 100, 150 move from their bottommost lowered positions to their top most raised positions. The second bed 150 is shown in dashed lines at its bottommost lowered position. The first and second beds 100, 150 are shown in solid lines at their topmost raised positions.

The bottom bed brackets 280 are raised via the chain connector 281 as the drive mechanism 40 rotates the drive shaft 260 in a second direction, e.g., the direction of arrow B. The bottom bed brackets 280 first contact the top bed brackets 290 when the beds 100, 150 are moving upward on their way toward their topmost raised positions. After the bottom bed brackets 280 contact the top bed brackets 290, the bottom bed brackets 280 push the top bed brackets 290 upward. At this position, the second bed 150 is positioned on top of the first bed 100, and the top bed brackets 290 rest on top of the respective bottom bed brackets 280.

The beds 100, 150 stop their upward movement when the top bed brackets 290 reach their topmost positions or when the user has deactivated the drive mechanism 40.

Alternative Stopper Supporting Holes

The description of the operation of the bed lift mechanism 30 described above applies to when the stoppers 216, 236 are positioned in the first stopper supporting holes 215a, 235a. However, when the beds 100, 150 are in the topmost raised positions, as shown in FIGS. 1B and 10B, the user can remove the stoppers 216, 236 from the first stopper supporting holes 215a, 235a and insert them into the second stopper supporting holes 215b, 235b shown in FIGS. 2 and 10B.

The second stopper supporting holes 215b, 235b serve to allow the stoppers 216, 236 to hold the second bed 150 at its topmost raised position while the first bed 100 is allowed to move up and down using the bed lift mechanism 30.

The second stopper supporting holes 215b, 235b are vertically aligned with the first stopper supporting holes 215a, 235a on the sides 211a, 231a of the vertical track members 210, 230. When the stoppers 216, 236 are positioned in the second stopper supporting holes 215b, 235b, the way in which the stoppers 216, 236 prevent the downward movement of the top bed bracket 290 is similar to the way in which the stoppers 216, 236 positioned in the first stopper supporting holes 215a, 235a prevent the downward movement of the top bed bracket 290.

The second stopper supporting holes 215b, 235b are preferably located near the top end 210a, 230a of the vertical track members 210, 230 and slightly below the tongue 293f of the top bed bracket 290 when the beds 100, 150 are positioned at their topmost raised positions. At this position, the bottom bed brackets 280 are supporting the top bed brackets 290 to keep the beds 100, 150 at their topmost raised positions. Thus, when the user activates the drive mechanism 40 to lower the bottom bed brackets 280, thereby lowering the beds 100, 150, the bottom bed brackets 280 begin to move downward. The top bed brackets 290 are prevented from moving downward once the tongues 293f in the top bed brackets 290 contact the stoppers 216, 236 in the second stopper supporting holes 215b, 235b.

With the second bed 150 restrained at the top end 210a, 230a of the vertical track members 210, 230, the first bed 100 is lowered and raised by itself, and the bottom bed brackets 280 do not support the top bed brackets 290 in this up and down movement.

Optionally, the bed lift mechanism 30 can be provided with a set of third stopper supporting holes 215c, 235c. The third stopper supporting holes 215c, 235c serve to allow the stoppers 216, 236 to hold the first and second beds 100, 150 at their topmost raised positions, thereby allowing the user to access the space underneath the beds 100, 150, e.g., for storage.

The third stopper supporting holes 215c, 235c are optional because the bed lift mechanism 30 is capable of raising both beds 100, 150 to their topmost raised positions and holding them there. However, the holes 215c, 235c can be provided as a safety mechanism to ensure that the beds 100, 150 do not move downward even when the drive mechanism 40 is inactive, e.g., if a component, such as a chain, of the bed lift mechanism 30 fails.

When the beds 100, 150 are in the topmost raised positions, as shown in FIGS. 1B and 10B, the user has the option to remove the stoppers 216, 236 from the first or second stopper supporting holes and to insert them into the third stopper supporting holes 215c, 235c, as shown in FIG. 2. As described above and shown in FIGS. 10A and 10B, the third stopper supporting holes 215c, 235c are not vertically aligned with the first and second stopper supporting holes since the third stopper supporting holes 215c, 235c are used to stop the downward movement of the bottom bed bracket 280, which does not include the tongue 293f of the top bed bracket 290. Since the bottom bed bracket 280 does not include a tongue, the third stopper supporting holes 215c, 235c are positioned to block the downward movement of the chain guide member 282 of the bottom bed bracket 280.

The third stopper supporting holes 215c, 235c are preferably located near the top end 210a, 230a of the vertical track members 210, 230 and slightly below the chain guide member 282 of the bottom bed bracket 280 which supports the first bed 100 when the beds 100, 150 are positioned at their topmost raised positions. At this position, the bottom bed brackets 280 support the top bed brackets 290 so that the beds 100, 150 are maintained at their topmost raised positions. Thus, when the user activates the drive mechanism 40 to lower the bottom bed brackets 280, thereby lowering the beds 100, 150, the bottom bed brackets 280 are prevented from moving downward once they contact the stoppers 216, 236 in the third stopper supporting holes 215c, 235c. Thus, both beds 100, 150 are maintained at or near their topmost raised positions.

Since the telescoping shaft 31 and the drive shafts 260, the slave shafts 270, 275, and the idler sprockets 219, 239 of the power and slave side assemblies 200, 300 are driven collectively by the single drive mechanism 40, there is no risk of binding in the bed lift mechanism 30. Since the primary drive sprockets 261, the secondary drive sprockets 262, the primary slave sprocket 271, the secondary slave sprockets 276, and the idler sprockets 219, 239 in the four vertical track members 210, 230 and the cross bar 250 in the power side assembly 200 and in the slave side assembly 300 are synchronized, there is no danger that a corner of either bed frame 120 moves at a faster rate than another corner. Furthermore, there is no danger that two different corners of either bed frame 120 starts or stops moving at different times. The sprockets at all of the corners of the bed frame 120 can be synchronized and driven at the same speed.

The primary and secondary drive sprockets 261, 262, the primary and secondary slave sprockets 271, 276, and the idler sprockets 219, 239 engage with the chains 220, 240 in a non-slip manner in the power and slave side assemblies 200, 300, thereby preventing misalignment of the beds 100, 150. Furthermore, the sprockets are completely enclosed within the frame 204 of the power and slave side assemblies 200, 300, thereby preventing any objects such as fingers or clothing from being caught between the sprockets.

Since the telescoping shaft 31 connects the power side assembly 200 to the slave side assembly 300, the bed lift mechanism 30 can be adapted for use with bed frames of varying lengths and trailers with varying distances between the side walls 23. Simply by extending or retracting the length of the telescoping shaft 31, the bed lift mechanism 30 can be mounted to shorter or longer bed frames according to the user's preference.

The cross bars 250 and the telescoping shaft 31 remain mounted close to the ceiling 21 of the trailer 10. Furthermore, all of the rotating parts are enclosed within the cross bars 250 and vertical track members 210, 230 in the power and slave side assemblies 200, 300. Therefore, fingers or other objects cannot be caught by the rotating parts, thereby providing a safe design. Alternatively, a storage space (not shown) can be incorporated underneath the bed frames 120 since there are no exposed rotating parts.

A motor can be provided in the drive mechanism 40 for powering the lift mechanism 30. Therefore, the lift mechanism 30 can be extended and retracted by pushing a button or by flipping a switch, for example. The motor can be provided with a manual override for connecting a hand crank. Furthermore, the motor can be replaceable by a hand crank for manually powering the lift mechanism 30 without requiring a separate power source.

The bed lift mechanism 30 is easy to assemble and disassemble. Furthermore, the bed lift mechanism 30 is easy to install and can be bought separately to install into the trailer 10. The bed frames 120 can be installed onto the power side assembly 200 and the slave side assembly 300 after mounting the frames 204 of the power side assembly 200 and the slave side assembly 300 to the side walls 23 of the trailer 10.

Furthermore, the vertical track members 210, 230 are positioned at each of the four corners of the bed frames 120, thereby ensuring a stable structure and allowing space for windows and window dressing therebetween.

The bed lift mechanism 40 provides a bunked bed and can deploy two separate beds 100, 150. This embodiment provides an additional bed and uses space efficiently since the beds 100, 150 are guided by the same frames 204.

The drive mechanism 40 does not move with the beds 100, 150 and is permanently fixed via the drive mechanism mounting bracket 257 to the cross bar 250 in the power side assembly 200. Therefore, any power cables for powering the drive mechanism 40 do not have to travel upwards and downwards with the bed frame 100. The power cables can be permanently mounted close to the ceiling 21 of the trailer 10, thereby providing an orderly appearance for the bed lift mechanism 40. Since the power cables are mounted close to the ceiling 21 of the trailer 10, the present invention also provides a safe environment without the risk of accidentally ripping the power cables.

All of the fasteners for fastening the bed lift mechanism 40 to the side walls 23 of the trailer 10 are positioned external to the vertical track member 210, 230 on the flanges 211c, 231c. Therefore, the person installing the bed lift mechanism 40 does not have to insert the fasteners through the channel 212, 232 of the vertical track members 210, 230, thereby risking dropping the fasteners inside the channel 212, 232 and having the fasteners fall underneath the idler sprocket 219, 239 at the bottom end 210b, 230b of the track members 210, 230, thereby risking damage to the parts inside the track members 210, 230.

The slot 214, 234 in the base 211b, 231b of the vertical track members 210, 230 is formed preferably ⅜" wide. This width provides increased safety by eliminating pinch points and by preventing fingers or other objects from being inserted into the slot and contacting the chain 220, 240 or brackets 280, 290.

The dimensions of the bed brackets 280, 290 are preferably configured so that at least a 1" gap is maintained between the two beds 100, 150 so that potential pinch points between the exposed bed support members 283, 293 of the bottom and top bed brackets 280, 290 are eliminated.

The bed lift mechanism 40 of the present invention also provides a stopper 216, 236 to prevent the beds 100, 150 from falling inadvertently when the beds 100, 150 are in their topmost raised positions. When the user places the stoppers 216, 236 in the third stopper supporting holes 215c, 235c while the beds are in the topmost raised positions, then the beds 100, 150 are prevented from falling inadvertently even if the drive mechanism fails or if the chain, brackets, or sprockets break.

The design of the bottom and top bed brackets 280, 290 allow the parts to hold together even under heavy loads, thereby ensuring a strong and stable connection between the beds 100, 150 and the bed brackets 280, 290. The secure connection between the components of the brackets 280, 290 ensures that gravitational forces, the weight of the bed, and other forces are prevented from disconnecting the bed support member 283, 293 to the chain guide member 282, 292. The frictional fit between the bed support member 283, 293 to the chain guide member 282, 292 of the bed brackets 280, 290 prevent any substantial movement between the components.

The bottom bed bracket 280 is compact, efficient, and easy to manufacture and allows a secure connection to the chains 220, 240.

The top bed bracket 290 is compact, efficient, and easy to manufacture and ensures contact with the stopper 216, 236 via the tongue 293f.

The attachment portion 283a, 293a of the bed brackets 280, 290 are positioned above and close to the mounting plates 284, 294 so that the bed brackets 280, 290 are positioned adjacent to the beds 100, 150. This configuration prevents the possibility of prying or breaking off the mounting plates 284, 294 from the beds 100, 150. Thus, the present invention provides increased stability in the bed lift mechanism 30. Even if the fasteners connecting the bed support bracket 110 to the mounting plates 284, 294 are loosened, as described above, the slop allows the beds 100, 150 to bounce up and down, but does not create a jarring effect that would pull the fasteners out from the beds 100, 150.

Figure 11:
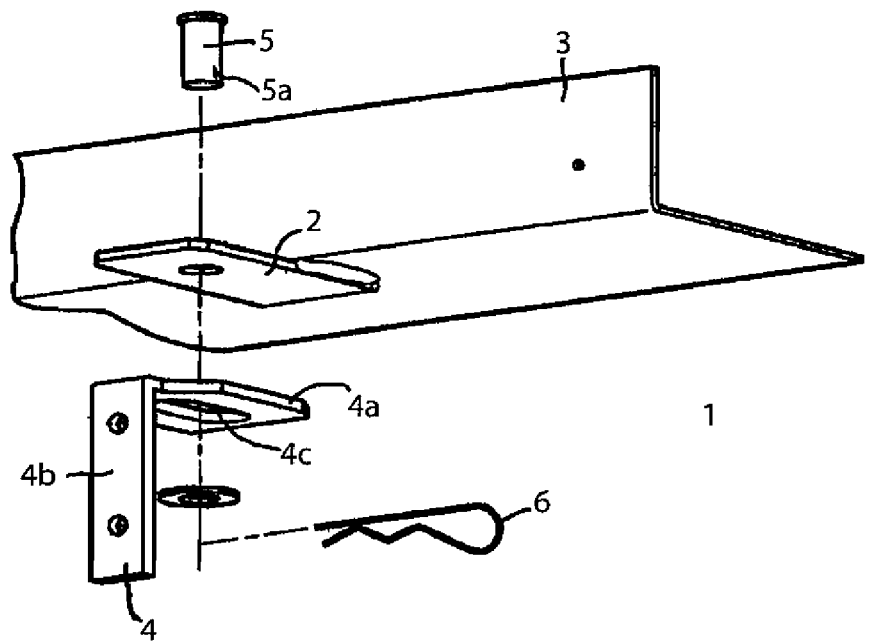
FIG. 11 is an exploded perspective view of a section of a mounting assembly for a bed of a conventional bed lift mechanism.

The bed support member 283, 293 and the mounting plates 284, 294 form a reverse bend in the bed bracket 280, 290. The reverse bend on the bed bracket 280, 290 forms a stronger and more secure connection with the bed support bracket 110 than the conventional bed bracket, such as the bed bracket 4 of the prior art (FIG. 11).

Having described embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A lift mechanism mounted to a support for raising and lowering a first bed and a second bed, the lift mechanism attached to a side of the first and the second beds and comprising:

at least one chain, at least one bottom bracket connected to the chain and attached to the first bed, at least one top bracket attached to the second bed and comprising:

a chain guide member for guiding the chain, the chain guide member comprising first and second members that are separated by at least one spacer, at least one of the first and second members receiving the chain; and a bed support member connecting to the at least one spacer of the chain guide member, the bed support member being attached to the second bed, a drive mechanism for controllably moving the chain to move the bottom bracket and the bed between a respective raised position and lowered position, and a frame assembly at least partially housing the at least one chain, the at least one bottom bracket, the at least one top bracket, and the drive mechanism, wherein the at least one top bracket is supported by the at least one bottom bracket as the first and the second beds are lowered until the at least one top bracket is stopped by a stopper mounted to the frame assembly.

2. The lift mechanism of claim 1, wherein the bed support member of the top bracket comprises:

an attachment portion that mounts to the second bed, and a hook connecting to the spacer of the chain guide member and positioned above a vertical position of the attachment portion.

3. The lift mechanism of claim 1, wherein the bed support member of the top bracket comprises a tongue inserted through a space formed by the at least one spacer between the first and second U shaped members of the chain guide member, and the tongue stops downward movement of the top bracket after contacting the stopper.

4. The lift mechanism of claim 1, wherein the at least one bottom bracket comprises:

a chain connector for connecting to the chain;

wherein the chain guide member receives the chain and is attached to the chain connector; and a bed support member attaching to the chain guide member and to the bed, at least a portion of the bed support member being inserted through the chain guide member.

5. The lift mechanism of claim 4, wherein the first member of the chain guide member receives the chain connector, and the second member of the chain guide member receives the chain.

6. The lift mechanism of claim 5, wherein the bed support member attaches to the at least one spacer of the chain guide member and to the bed.

7. The lift mechanism of claim 4, wherein the chain connector and the bed support member are substantially perpendicular to each other.

8. The lift mechanism of claim 4, wherein the chain connector comprises a tongue that is inserted through at least one slot in the chain guide member.

9. The lift mechanism of claim 8, wherein the tongue is held in place in the at least one slot in the chain guide member via a frictional fit.

10. The lift mechanism of claim 1, wherein each of the first and second members of the chain guide member is U-shaped.

11. The lift mechanism of claim 1, further comprising a frame assembly mounted to the support for the lift mechanism, the frame assembly comprising at least one track member that at least partially houses the at least one chain, the at least one bracket, and the drive mechanism, wherein at least one of the track members of the frame assembly comprises a slot along which the bed support member of the bracket is guided; and the slot has a width of less than or equal to $3/8$".

12. The lift mechanism of claim 1, wherein the frame assembly comprises at least one track member at least partially housing the at least one chain, the at least one bracket, and the drive mechanism, wherein at least one of the track members of the frame assembly comprises a flange that is positioned against the support for the lift mechanism outside of a channel formed by the track member; and fasteners are inserted into the flange to mount the track member to the support.

* * * * *